United States Patent [19]
Masumoto

[11] Patent Number: 5,649,753
[45] Date of Patent: Jul. 22, 1997

[54] PROJECTION DISPLAY APPARATUS

[75] Inventor: Yoshihiro Masumoto, Kobe, Japan

[73] Assignee: Matsushita Electric Industrial Co., Ltd., Kadoma, Japan

[21] Appl. No.: 440,068

[22] Filed: May 12, 1995

[30] Foreign Application Priority Data

May 16, 1994 [JP] Japan .................................. 6-101076
Mar. 17, 1995 [JP] Japan .................................. 7-058918

[51] Int. Cl.⁶ .................................................. G03B 21/14
[52] U.S. Cl. .............................. 353/102; 353/30; 353/85; 353/38
[58] Field of Search ................................. 353/31, 30, 94, 353/102, 38, 85; 359/48, 49; 362/244, 245, 235, 236

[56] References Cited

U.S. PATENT DOCUMENTS

| | | | |
|---|---|---|---|
| 4,488,207 | 12/1984 | Harmon | 362/231 |
| 4,552,441 | 11/1985 | Dewey | 353/31 |
| 4,701,023 | 10/1987 | Hager et al. | 350/321 |
| 5,098,184 | 3/1992 | van den Brandt | 353/102 |
| 5,174,649 | 12/1992 | Alston | 362/244 |
| 5,355,187 | 10/1994 | Ogino et al. | 353/38 |
| 5,382,790 | 1/1995 | Robillard et al. | 250/216 |
| 5,396,350 | 3/1995 | Beeson et al. | 359/48 |
| 5,467,206 | 11/1995 | Loiseaux et al. | 353/38 |
| 5,491,525 | 2/1996 | Yamasaki et al. | 353/98 |

FOREIGN PATENT DOCUMENTS

| | | |
|---|---|---|
| 0180800 | 5/1986 | European Pat. Off. . |
| 0563874 | 10/1993 | European Pat. Off. . |
| 60-2916 | 1/1985 | Japan . |
| 435048 | 6/1992 | Japan . |
| 5157971 | 6/1993 | Japan .................. 359/40 |
| 6265887 | 9/1994 | Japan . |
| 9201969 | 2/1992 | WIPO . |

OTHER PUBLICATIONS

Search Report for European Appl. 95107338.5, mailed Sep. 5, 1995.

Primary Examiner—William Dowling
Attorney, Agent, or Firm—Renner, Otto, Boisselle, Sklar

[57] ABSTRACT

A projection display apparatus includes a light source, a light valve, and a projection lens. The light source includes at least two luminous elements, a plurality of light condensing devices provided in the same number as the luminous elements, and a light transmitting device for transmitting the light beams outgoing from the respective light condensing devices to the light valve in a superimposed state. The light transmitting optical device forms actual images of the plurality of luminous elements on an optical path thereof so that the actual images are substantially inscribed in a circle on the same, single plane. The projection display apparatus further includes a device for lighting up at least one of the plurality of luminous elements selectively so as to change the brightness of the image displayed by projection by steps.

30 Claims, 29 Drawing Sheets

PROJECTION DISPLAY APPARATUS

BACKGROUND OF THE INVENTION

1. Field of the Invention

The present invention relates to a projection display apparatus for projecting an optical image formed on a light valve onto a screen in a magnified state by a projection lens.

2. Description of the Related Art

Conventionally, various methods for projecting an optical image formed on a light valve onto a large screen using a projection lens to display a video image in a magnified state are known. As a display apparatus used for such methods, a projection display apparatus including a liquid crystal panel as a light valve is known today (disclosed in, for example, Japanese Laid-Open Patent Publication No. 60-2916 and Japanese Patent Publication No. 4-35048).

With reference to FIG. 30, a basic structure of such a projection display apparatus will be described.

As is illustrated in FIG. 30, the projection display apparatus includes a light source 502, a liquid crystal panel 503, and a projection lens 504. A field lens 505 is used for effectively transmitting light which has passed through the liquid crystal panel 503 to the projection lens 504.

The light source 502 includes, for example, a lamp 506 and a concave mirror 507, and outputs light for illuminating the liquid crystal panel 503. Recently, use of a metal halide lamp as the lamp 505 is being expanded due to the high luminous efficacy and satisfactory color reproduction properties thereof. Instead of the metal halide lamp, a halogen lamp or a xenon lamp, for example, may be used. A UV (ultraviolet)-IR (infrared) cutting filter 508 is used for removing infrared rays and ultraviolet rays from the light emitted by the light source 502.

The liquid crystal panel 503 forms an optical image by changing the light transmittance spatially in accordance with a video signal and projects the optical image on a large screen by the projection lens 504 to display a video image in a magnified state.

As the liquid crystal panel 503, a twisted nematic (hereinafter, referred to as "TN") liquid crystal panel driven by an active matrix system is mainly used. Such a type of liquid crystal panel has an advantage of providing a relatively high contrast between a white area and a black area and thus displaying a high quality video image.

Such a conventional projection display apparatus has a problem of a low brightness of the image formed on the screen. Especially, a TN liquid crystal panel displays an image using light polarization. For this reason, approximately 50% of the natural light which is incident on the liquid crystal panel is lost. Generally, as the density of pixels increases, the aperture ratio of each pixel (the ratio of the area of an aperture of the pixel with respect to the total area of the pixel) decreases. A part of the light which is not transmitted through the aperture is reflected or absorbed by a light shielding layer of the liquid crystal panel and thus is lost. The light transmittance of a general TN type liquid crystal panel is less than 10%. In other words, a major part of the light emitted by the light source is lost.

Accordingly, in order to produce a projection display apparatus having a large luminous output, a light source which provides a large luminous output for illuminating the light valve is needed. A light source having a large luminous output requires a lamp having a high luminous efficacy and a high level of power, and efficient condensing of the light emitted by the lamp.

In general, a lamp having a high level of power has a relatively great total length, which prevents formation of a compact projection display apparatus. Since a lamp having a higher level of power is usable in fewer applications, it is difficult to obtain a lamp which fulfills the desired specifications and performance. These problems can be solved by newly developing a lamp having a desired level of power, but such development requires a relatively long time period. Further, such a lamp having special specifications is more costly than multi-purpose lamps.

A metal halide lamp has a luminous efficacy which is approximately three times the luminous efficacy of a xenon lamp or a halogen lamp. Accordingly, the amount of light emitted by a light source including a metal halide lamp is approximately three times higher if the level of power of the lamp is the same. However, the above-described problems are more serious when a metal halide lamp is used.

The light emitting characteristics of the metal halide lamp depend heavily on factors such as the type or the amount of the metal added, the shape of the tube, the arc length, and the level of power of the lamp. While a multi-purpose lamp having a power of 250 W which fulfills the desired light emitting characteristics is available relatively easily, it requires a long time and investment of a large sum of money to newly develop a lamp having a power of 500 W or 1 kW and also the equivalent light emitting characteristics. Accordingly, the cost of the lamp and a circuit for turning the lamp on increases, and thus the cost of the projection display apparatus is raised.

Generally, as the level of power of the lamp rises, the size of a luminous element in the lamp increases. In the case of a metal halide lamp, the length of the luminous element increases substantially in proportion to the level of power of the lamp. If the level of power of the lamp is raised without increasing the length of the luminous element, the light emitting characteristics are deteriorated and thus the life of the lamp is shortened.

When the luminous element is large, light emitted by various parts of the luminous element proceeds in various directions. Thus, it is difficult to condense the light efficiently. For example, in the case that light emitted by a lengthy luminous element of a metal halide lamp is condensed by a parabolic mirror, the light reflected on the parabolic mirror is relatively highly parallel in the direction corresponding to the direction of a shorter axis of the luminous element, but is not parallel sufficiently in the direction corresponding to a longer axis of the luminous element. In such a case, in order to raise the light utilization efficiency, a further optical system is needed downstream with respect to the parabolic mirror in a direction in which the light is transmitted to utilize a light beam running at a largest angle with respect to an axis of the light. For example, the projection lamp needs to have a larger diameter so as to correspond to the largest angle. A lens having such a large diameter is not preferable because the restriction of various aberrations is difficult and such a lens is generally costly.

For the above-described reasons, a luminous element preferably has a minimum possible size. The light emitting surface thereof preferably has a shape which is as close as possible to a globe because the expanding angle of light emitted by a globe-shaped luminous element is averaged in all the directions. A metal halide lamp having a high level of power is not preferable because a lengthy luminous element thereof prevents efficient light condensing.

As an apparatus having a high efficiency of light condensing and realizing light radiation which provides the light receiving surface with a uniform brightness, an optical integrator including two lens arrays is known (disclosed in, for example, in the U.S. Pat. No. 5,098,184). In an optical integrator, a light beam obtained by condensing light which is emitted by the lamp is divided by two lens arrays to average the brightness and is then transmitted to the light receiving surface.

Such an optical integrator has the above-described problems when bright light radiation using a lamp having a high level of power is needed. Since the total length of the lamp is large, it is difficult to form a compact light source. A larger light source requires an optical element such as a lens array having a larger effective diameter, which raises the cost. In order to utilize light emitted by a lengthy luminous element efficiently, the effective aperture of the lens array needs to be enlarged. This causes problems in ease of production and production cost of the lens array.

Especially in the case of a metal halide lamp, luminous output variation is difficult. If a different level of power from the prescribed level of power of the lamp is provided, luminous output changes but problems occur such that the emission spectrum changes significantly, the light cannot be kept on, the life is shortened significantly, and the lamp is easily broken. Accordingly, a projection display apparatus including such a lamp has a problem that adjustment of brightness of an image formed on the screen is difficult. Although the brightness is lowered by decreasing the light transmittance of the light valve, the display quality of the image formed on the screen by projection is also lowered. If a separate element for adjusting the brightness, for example, a variable diaphragm is added, the number of components and the cost increase.

SUMMARY OF THE INVENTION

In one aspect of the present invention, a projection display apparatus for displaying an image on a screen by projection includes a light valve for forming an optical image by spatially modulating light; a light source for forming light for illuminating the optical image; and a projection lens for projecting the optical image on the screen. The light source includes at least two luminous elements each for emitting light, a plurality of light condensing devices provided in the same number as the luminous elements to respectively correspond to the luminous elements, each of the light condensing devices condensing light emitted by the corresponding luminous element to form a light beam transmitting in substantially a single direction, and a light transmitting device for transmitting the light beams outgoing from the corresponding light condensing devices to the light valve so as to superimpose the light beams on the optical image.

In one embodiment of the invention, the light transmitting device forms actual images of the luminous elements on an optical path, the number of the actual images being N times the number of the luminous elements where N is an integer of at least one; the actual images are substantially inscribed in a circle on a plane; and lenses on the optical path between the plane and an entrance pupil of the projection lens allow the plane and the entrance pupil to be substantially conjugate with each other.

In one embodiment of the invention, the light transmitting device includes first lenses provided in the same number as the light condensing devices to respectively correspond to the light condensing devices; second lenses provided in the same number as the first lenses to respectively correspond to the first lenses; and a third lens located in the vicinity of a surface of the light valve on which light is incident. The first lenses each converge the light beam outgoing from the corresponding light condensing device on a principal plane of the corresponding second lens and the vicinity thereof to form an actual image of the corresponding luminous element. The second lenses each form an actual image of an object formed on a principal plane of the corresponding first lens and the vicinity thereof onto a principal plane of the third lens and the vicinity thereof so as to superimpose the actual images. The third lens allows the light beam incident thereon to reach the projection lens effectively.

In one embodiment of the invention, the plurality of first lenses are each appropriately decentered so as to arrange the plurality of actual images of the plurality of luminous elements formed by the first lenses to be inscribed in a circle having a minimum possible radius.

In one embodiment of the invention, the plurality of second lenses are each appropriately decentered so as to allow a light beam passing through a center of an aperture of the corresponding first lens to reach a position in a center of an effective display area of the light valve and the vicinity thereof.

In one embodiment of the invention, the light transmitting device includes first lens arrays provided in the same number as the light condensing devices to respectively correspond to the light condensing devices; second lens arrays provided in the same number as the first lens arrays to respectively correspond to the first lens arrays; and a third lens located in the vicinity of a surface of the light valve on which light is incident. The first lens arrays each include a plurality of first lenses arranged two dimensionally. The second lens arrays each include a plurality of second lenses arranged two dimensionally and provided in the same number as the first lenses to respectively correspond to the first lenses. The first lenses each converge the light beam which is incident thereon after outgoing from the corresponding light condensing device onto a principal plane of the corresponding second lens and the vicinity thereof to form an actual image of the corresponding luminous element. The second lenses each form an actual image of an object formed on a principal plane of the corresponding first lens and the vicinity thereof onto a principal plane of the third lens and the vicinity thereof so as to superimpose the actual images. The third lens allows the light beam incident thereon to reach the projection lens effectively.

In one embodiment of the invention, the plurality of second lenses have apertures having appropriately different sizes and shapes from each other, each of the apertures being sufficiently large with respect to the actual image of the corresponding luminous element; and an effective aperture of each of the second lens arrays has a minimum possible area.

In one embodiment of the invention, the plurality of first lenses are each appropriately decentered so as to locate an actual image of the luminous element formed by the first lens in a center of an aperture of the corresponding second lens and the vicinity thereof.

In one embodiment of the invention, the plurality of second lenses are each appropriately decentered so as to allow a light beam passing through a center of an aperture of the corresponding first lens to reach a position in a center of an effective display area of the light valve and the vicinity thereof.

In one embodiment of the invention, the projection lens includes a converging lens having a positive power in the vicinity of a surface of the light valve from which light is outgoing, and at least one of optical surfaces of the converging lens has a shape which is proximate to an aspherical shape.

In one embodiment of the invention, the optical surface of the converging lens on the surface of the light valve from which the light is outgoing is a Fresnel lens having a shape which is proximate to an aspherical shape.

In one embodiment of the invention, the light transmitting device has an optical surface having a property for scattering light on a plane on which actual images of the plurality of luminous elements are formed and the vicinity thereof.

In one embodiment of the invention, at least one of optical surfaces of lenses included in the light transmitting device has a shape which is proximate to an aspherical shape.

In one embodiment of the invention, the light source includes lamps acting as luminous elements which are provided in one of the numbers of two, four, six and nine.

In one embodiment of the invention, the plurality of luminous elements are each a lamp, and the plurality of lamps are supported by a single supporting structure so as to be replaceable by a single operation step of replacing the supporting structure.

In one embodiment of the invention, the light condensing devices each include a concave mirror, and the concave mirror has a reflective surface which is proximate to one of a parabolic surface and an ellipsoid surface.

In one embodiment of the invention, the light valve includes a twisted nematic type liquid crystal panel including a pixel electrode.

In one embodiment of the invention, the luminous elements are each a metal halide lamp.

In one embodiment of the invention, the projection display apparatus further includes lamp voltage supplying devices provided in the same number as the metal halide lamps to respectively correspond to the metal halide lamps; and a high-voltage pulse generating device which is shared by at least two metal halide lamps. The lamp voltage supply devices each supply a lamp voltage to the respectively corresponding metal halide lamp for normal operation to form the luminous element. The high-voltage pulse generating device is selectively interposed between one of the lamp voltage supply devices and the corresponding metal halide lamp to generate a high-voltage pulse which is necessary to start up the metal halide lamp.

In one embodiment of the invention, the metal halide lamps each include at least one of dysprosium and neodymium.

In one embodiment of the invention, the metal halide lamps each include at least one of gadolinium and lutetium.

In another aspect of the present invention, a projection display apparatus for displaying an image on a screen by projection includes a light valve for forming an optical image by spatially modulating light; a light source for forming light for illuminating the optical image; and a projection lens for projecting the optical image on the screen. The light source includes at least two luminous elements each for emitting light, a plurality of light condensing devices provided in the same number as the luminous elements to respectively correspond to the luminous elements, each of the light condensing devices condensing light emitted by the corresponding luminous element to form a light beam, and optical axes of the plurality of light condensing optical devices are tilted with respect to the normal direction to an effective display area of the light valve and cross each other at a position in a center of the effective display area and the vicinity thereof.

In one embodiment of the invention, the projection display apparatus further includes a filter for removing one of infrared rays and ultraviolet rays on an optical axis of each of the plurality of light condensing devices.

In one embodiment of the invention, the projection display apparatus further includes a filter for removing light of a part of the range of wavelengths of visible light on an optical axis of each of the plurality of light condensing devices.

In one embodiment of the invention, the projection display apparatus further includes a plurality of lamp units respectively including the luminous elements and the corresponding light condensing devices which are held integrally, each luminous element being a lamp; and a frame including a reference plane which is at one of a parallel position and a perpendicular position with respect to the normal direction to the light valve. The lamp units are each arranged so as to be tilted in a prescribed direction at a prescribed angle with respect to the frame.

In one embodiment of the invention, the projection display apparatus further includes a light transmitting device for superimposing the light beams outgoing from the plurality of light condensing devices on the optical image formed on the light valve. The light transmitting device includes first lenses provided in the same number as the light condensing devices to respectively correspond to the light condensing devices; second lenses provided in the same number as the first lenses to respectively correspond to the first lenses; and a third lens located in the vicinity of a surface of the light valve on which light is incident. The first lenses each converge the light beam incident thereon onto a principal plane of the corresponding second lens and the vicinity thereof. The second lenses each form an actual image of an object formed on a principal plane of the corresponding first lens and the vicinity thereof onto a principal plane of the third lens and the vicinity thereof so as to superimpose the actual images. The third lens allows the light beam incident thereon to transmit to the projection lens effectively. An optical axis of each of the first lenses and an optical axis of each of the second lenses are parallel to the optical axis of the corresponding light condensing device.

In one embodiment of the invention, the projection display apparatus further includes a plurality of lens units each including each of the first lenses and the corresponding second lens which are held integrally; and a frame including a reference plane which is at one of a parallel position and a perpendicular position with respect to the normal direction to the light valve. The lens units are each arranged so as to be tilted in a prescribed direction at a prescribed angle with respect to the frame.

In one embodiment of the invention, the projection display apparatus further includes a plurality of lamp units respectively including the luminous elements and the corresponding light condensing devices which are held integrally, each luminous element being a lamp; a plurality of lens units provided in the same number as the lamp units to respectively correspond to the lamp units and respectively including the first lenses and the corresponding second lenses which are held integrally; and a frame including a reference plane which is at one of a parallel position and a perpendicular position with respect to the normal direction to the light valve. Each of the lamp units and each of the lens units are arranged so as to be tilted in a prescribed direction at a prescribed angle with respect to the frame.

In still another aspect of the present invention, a projection display apparatus for displaying an image by projection includes a light valve for forming an optical image by spatially modulating light; a light source for forming light for illuminating the optical image; and a projection lens for projecting the optical image on the screen. The light source includes at least two luminous elements each for emitting light, at least one lighting circuit for forming the luminous elements by power externally supplied; and a lighting control device for controlling the lighting circuit to light up at least one of the luminous elements selectively. The light source transmits light emitted by the plurality of luminous elements to the optical image in a superimposed state so as to illuminate the optical image. The light control device changes the number of luminous elements to be lit up to change the brightness of an image displayed on the screen by projection.

In one embodiment of the invention, the plurality of lamps are each a metal halide lamp,and a plurality of lighting circuits are provided for respectively lighting up the metal halide lamps. The lighting control device supplies power to a prescribed number of lighting circuits selectively to form the luminous elements.

In one embodiment of the invention, the projection display apparatus further includes a lighting time accumulation device for accumulating lighting time of each of the plurality of luminous elements. The lighting control device controls the lighting circuits to light up at least one of the luminous elements having shorter lighting time with priority based on data supplied by the light time accumulation device.

Thus, the invention described herein makes possible the advantage of providing a compact projection display apparatus for projecting a bright, high quality image with relatively low cost by forming an inexpensive light source generating a large luminous output using a plurality of lamps.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

A projection display apparatus 1000 in a first example according to the present invention will be described with reference to FIGS. 1 and 2.

Figure 1:
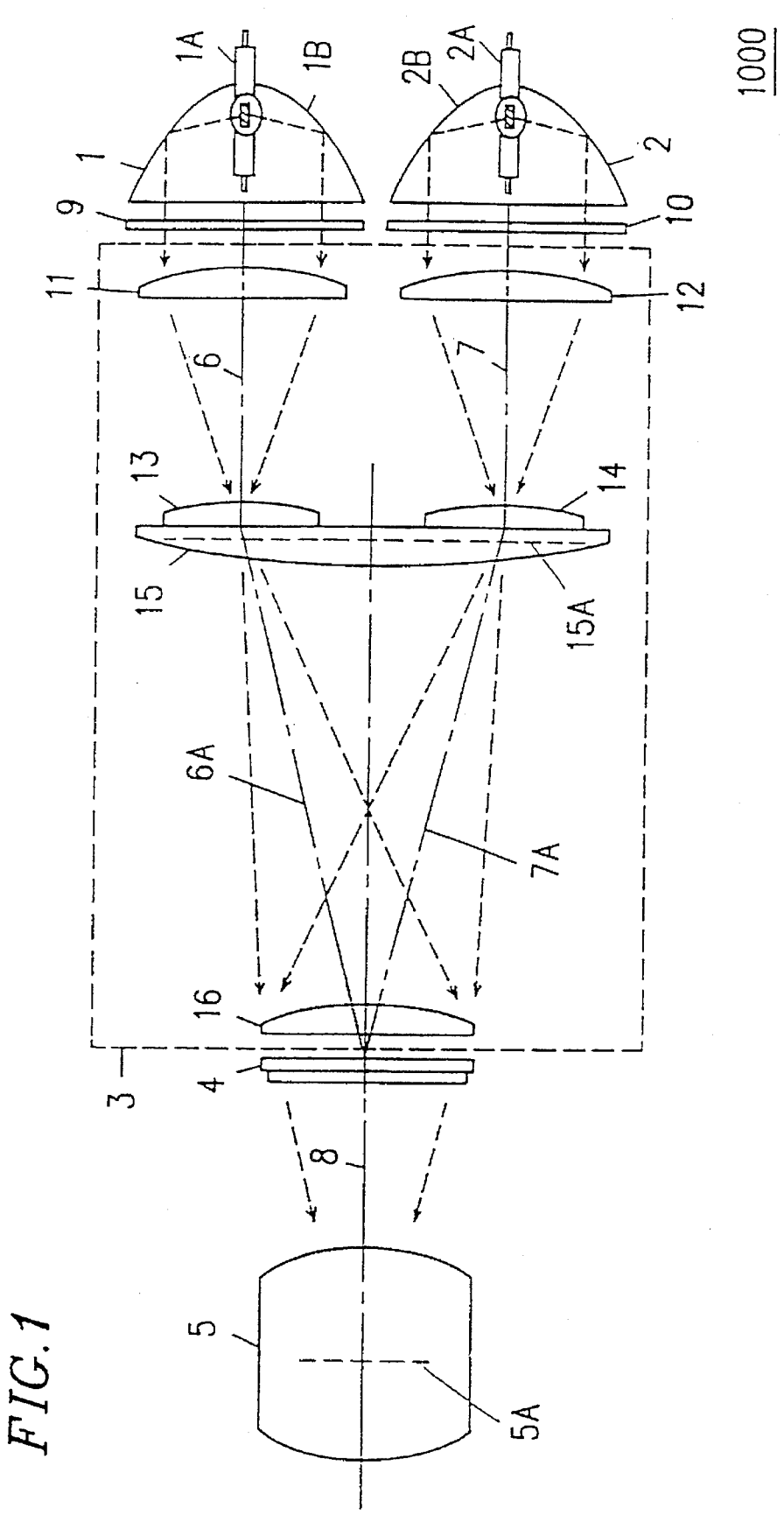
FIG. 1 is a schematic view of a projection display apparatus in a first example according to the present invention.

FIG. 1 is a schematic view of the projection display apparatus 1000, illustrating a structure thereof.

As is illustrated in FIG. 1, the projection display apparatus 1000 includes light condensing optical systems 1 and 2, a light transmitting optical system 3, a liquid crystal panel 4, and a projection lens 5. Light beams respectively outgoing from the light condensing optical systems 1 and 2 are transmitted to the liquid crystal panel 4 by the light transmitting optical system 3, and an optical image formed on the liquid crystal panel 4 is displayed on a screen (not shown) by the projection lens 5 in a magnified state. In this manner, a video image is displayed on a large screen.

The light condensing optical system 1 includes a metal halide lamp 1A and a parabolic mirror 1B. The light condensing optical system 2 includes a metal halide lamp 2A and a parabolic mirror 2B. The light condensing optical system 1 has an optical axis 6, which is the axis of revolutionary symmetry for the parabolic mirror 1B. The light condensing optical system 2 has an optical axis 7, which is the axis of revolutionary symmetry for the parabolic mirror 2B. In the light condensing optical systems 1 and 2, the light emitted by luminous elements of the metal halide lamps 1A and 2A is condensed by the parabolic mirrors 1B and 2B to be light beams, and thus the light beams run along the optical axes 6 and 7, respectively. UV-IR cutting filters 9 and 10 are used for removing unnecessary infrared rays and ultraviolet rays from the light emitted by the metal halide lamps 1A and 2A, respectively.

The light transmitting optical system 3 includes first lenses 11 and 12, second lenses 13 and 14, a beam composing lens 15, and a third lens 16. The first lenses 11 and 12 are each a planoconvex lens, and the optical axes thereof correspond to the optical axis 6 and 7, respectively. The second lenses 13 and 14 are each a planoconvex lens, and the optical axes thereof correspond to the optical axes 6 and 7.

The beam composing lens 15 is a planoconvex lens, and the optical axis thereof corresponds to an optical axis 8 of the projection lens 5. The second lenses 13 and 14, and the beam composing lens 15 are located in contact with each other while flat surfaces thereof are opposed to each other. The third lens 16 is a planoconvex lens, and the optical axis thereof corresponds to the optical axis 8 of the projection lens 5. The optical axis 8 of the projection lens 5 passes through the center of an effective display area of the liquid crystal panel 4.

Figure 2:
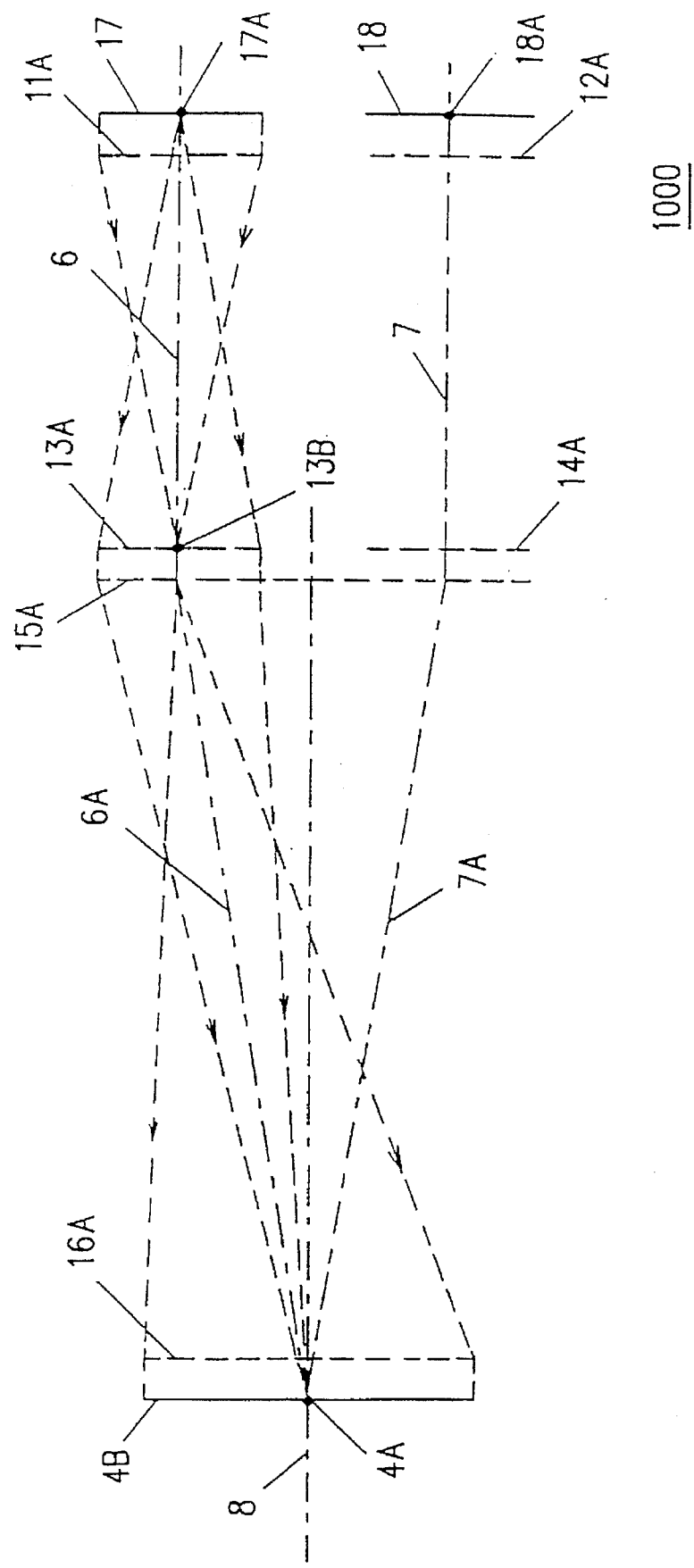
FIG. 2 is a view illustrating the operation of a light transmitting optical system in the projection display apparatus shown in FIG. 1.

With reference to FIG. 2, the operation of the light transmitting optical system 3 will be described. In FIG. 2, each of the above-mentioned lenses is illustrated as a straight line. Reference numeral 11A denotes a principal plane of the first lens 11, and reference numeral 12A denotes a principal plane of the first lens 12. Reference numeral 13A denotes a principal plane of the second lens 13, and reference numeral 14A denotes a principal plane of the second lens 14. Reference numeral 15A denotes a principal plane of the beam composing lens 15, and reference numeral 16A denotes a principal plane of the third lens 16. Reference numeral 4B denotes the effective display area of the liquid crystal panel 4, and reference numeral 4A denotes the center of the effective display area 4B.

The first lens 11 converges light which is emitted by the light condensing optical system 1 at a position in a center 13B of the principal plane 13A of the second lens 13 and the vicinity thereof. Thus, an actual image of the luminous element of the metal halide lamp 1A is formed on the principal plane 13A. The first lens 12 forms an actual image of the luminous element of the metal halide lamp 2A on the principal plane 14A in the same manner.

The beam composing lens 15 refracts the optical axis 6 into an optical axis 6A and causes the optical axis 6A and the optical axis 8 to cross each other at the center 4A of the effective display area 4B of the liquid crystal panel 4. The beam composing lens 15 also refracts the optical axis 7 into an optical axis 7A and causes the optical axis 7A and the optical axis 8 to cross each other at the center 4A of the effective display area 4B. The second lens 13 and the beam composing lens 15 form an actual image of an object 17 located on the principal plane 11A of the first lens 11 and the vicinity thereof at a position in the effective display area 4B and the vicinity thereof. In the same manner, the second lens 14 and the beam composing lens 15 form an actual image of an object 18 located on the principal plane 12A of the first lens 12 and the vicinity thereof at a position in the effective display area 4B and the vicinity thereof.

In the projection display apparatus 1000 having the above-described structure, a light beam emitted from a Center 17A of the object 17 and a light beam emitted from a center 18A of the object 18 both reach the vicinity of the center 4A of the effective display area 4B. Accordingly, the two light beams outgoing from the light condensing optical systems 1 and 2 can be superimposed on the effective display area 4B. By appropriately selecting the magnification ratio of each of the second lens 13 and the beam composing lens 15, the entire effective display area 4B can be illuminated satisfactorily by the light beam outgoing from the light condensing optical system 1. In the same manner, by appropriately selecting the magnification ratio of each of the second lens 14 and the beam composing lens 15, the entire effective display area 4B can be illuminated satisfactorily by the light beam outgoing from the light condensing optical system 2.

Further, optical elements existing on an optical path from the principal plane 15A of the beam composing lens 15 to an entrance pupil 5A (FIG. 1) of the projection lens 5 cause the principal plane 15A and the entrance pupil 5A to be conjugate with each other. Since the beam composing lens 15 and the second lenses 13 and 14 are adjoining to each other, the principal planes 15A, 13A, and 14A are considered as one surface for simplicity.

As is described above, the actual images of the metal halide lamps 1A and 2A are formed on the principal plane 15A of the beam composing lens 15. Accordingly, these actual images are formed on the entrance pupil 5A of the projection lens 5. The lamps and other elements of the projection display apparatus 1000 are arranged so that the actual images of the luminous elements formed on the entrance pupil 5A can be inscribed in a circle having a minimum possible radius. By such an arrangement, optical loss can be alleviated in combination with use of a projection lens having a small diameter.

The optical utilization efficiency in the projection display apparatus 1000 in the first example will be described.

The light emitted by the metal halide lamps 1A and 2A is mostly condensed by the parabolic mirrors 1B and 2B to be light beams and are incident on the first lenses 11 and 12, respectively. The aperture of each of the second lenses 13 and 14 is formed to be sufficiently large with respect to the actual images of the luminous elements formed on the principal planes 13A and 14A. Due to such large apertures, the light beams incident on the first lenses 11 and 12 entirely reach the third lens 16 and illuminate the liquid crystal panel 4. Moreover, the light beams outgoing from the actual images formed on the principal planes 13A and 14A mostly reach the entrance pupil 5A of the projection lens 5 and are projected on the screen. Because of such an operation, image formation on the screen can be performed with very little loss of the light emitted by the metal halide lamps 1A and 2A.

In the projection display apparatus 1000 in the first example, as is described above, light emitted by a plurality of lamps is transmitted to the liquid crystal panel as a plurality of light beams in a superimposed state, and further the light beams transmitted through the liquid crystal panel are transmitted to the projection lens efficiently. By such an operation, an image which is much brighter can be formed by projection when compared with an image formed by a conventional apparatus. Moreover, due to the superimposition of the light beams from the plurality of lamps, the image formed on the screen by projection has very little non-uniformity in brightness.

If the light source includes a single lamp which consumes power twice as high as a single metal halide lamp is used, instead of the two metal halide lamps 1A and 2A, the total length of the lamp is approximately twice as long, in general. The diameter of the tube of the lamp also increases. Therefore, it is difficult to form a compact light source using a single such lamp. Since the length of the luminous element is twice as long, it is difficult to utilize the light efficiently. By contrast, in the projection display apparatus 1000 in the first example according to the present invention, the light source includes two, relatively compact light condensing optical systems arranged side by side, and thus the entire light source is compact. Further, since light emitted by relatively small luminous elements is condensed separately, the light utilization efficiency is raised. As a result, a compact projection display apparatus which forms a bright image can be provided.

EXAMPLE 2

A projection display apparatus 2000 in a second example according to the present invention will be described with reference to FIGS. 3 through 5.

Figure 3:
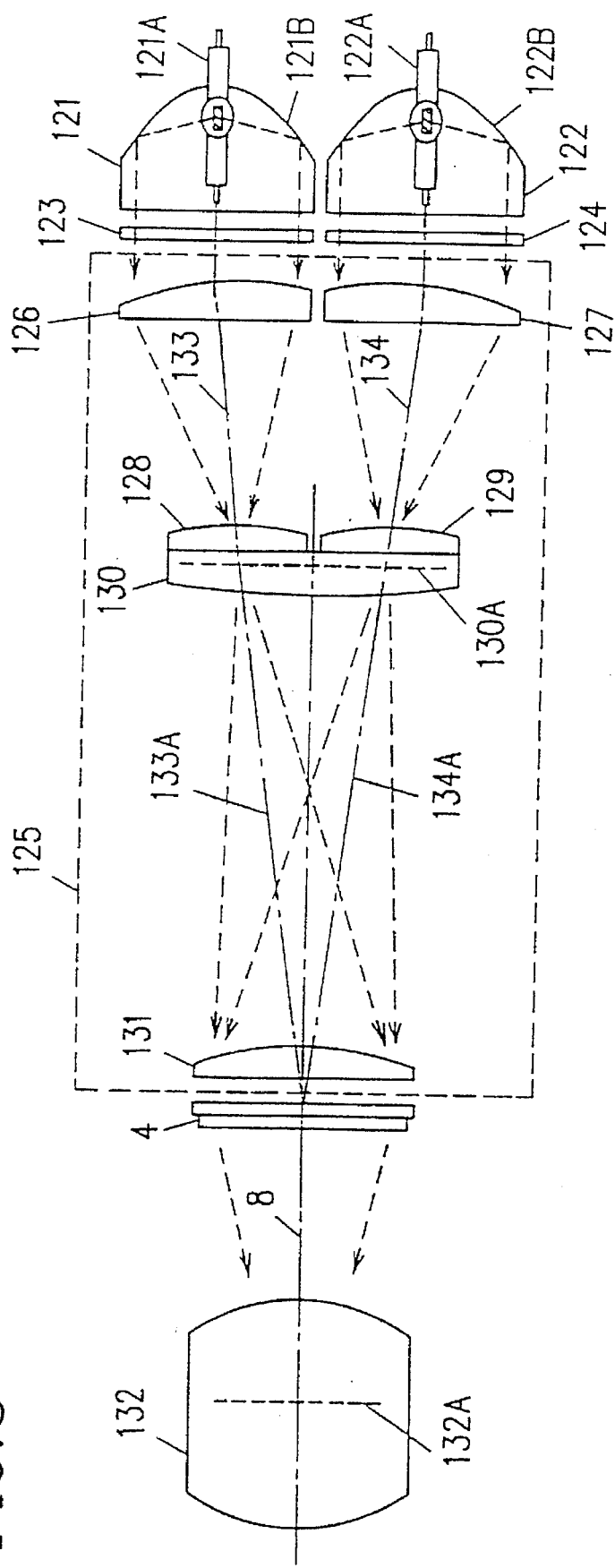
FIG. 3 is a schematic view of a projection display apparatus in a second example according to the present invention.

FIG. 3 is a schematic view of the projection display apparatus 2000, illustrating a structure thereof.

As is illustrated in FIG. 3, the projection display apparatus 2000 includes light condensing optical systems 121 and 122, a light transmitting optical system 125, a liquid crystal panel 4, and a projection lens 132.

The light condensing optical system 121 includes a metal halide lamp 121A which is the same as the metal halide lamp 1A, and a parabolic mirror 121B. The light condensing optical system 122 includes a metal halide lamp 122A which is the same as the metal halide lamp 2A, and a parabolic mirror 122B. Surface of each of the parabolic mirrors 121B and 122B is partially cut off as is illustrated in FIG. 3. Shaping the parabolic mirrors 121B and 122B as is shown in FIG. 3 is advantageous in locating the two mirrors 121B and 122B closer to each other. UV-IR cutting filters 123 and 124 are the same as the UV-IR cutting filters 9 and 10.

The light transmitting optical system 125 includes first lenses 126 and 127, second lenses 128 and 129, a beam composing lens 130, and a third lens 131. All the elements in the light transmitting optical system 125 act in the same manner as the corresponding elements in the first example, except that the first lenses 126 and 127 are appropriately decentered. An optical system between a principal plane 130A of the beam composing lens 130 and an entrance pupil 132A of the projection lens 132 is structured so as to conjugate the principal plane 130A and the entrance pupil 132A in the same manner as in the first example.

The first lenses 126 and 127 form actual images of the respective luminous elements at positions on principal planes of the second lenses 128 and 129 and the vicinity thereof. Because the second lenses 128 and 129, and the beam composing lens 130 are adjoining to each other, the plurality of actual images of the luminous elements are formed on the principal plane 130A of the beam composing lens 130. When the images are formed on the principal plane 130A, which is one plane on the optical path in the light transmitting optical system 125, the light beams outgoing from the parabolic mirrors 121B and 122B are converged to have a minimum diameter on the principal plane 130A. Because the principal plane 130A and the entrance pupil 132A of the projection lens 132 are conjugated with each other, the light emitted by the plurality of luminous elements can be mostly transmitted to the projection lens 132 efficiently.

In order to avoid optical loss in the projection lens 132, the entrance pupil 132A needs to be larger than the effective cross section of the optical beam transmitted therethrough. However, a projection lens have a small "F" number generally has a relatively large entrance pupil and also has a large lens diameter and thus is costly. Considering this point, the light beams transmitted through the entrance pupil preferably has a minimum possible cross section. The light transmitting optical system 125 is structured in consideration of this point.

Figure 4:
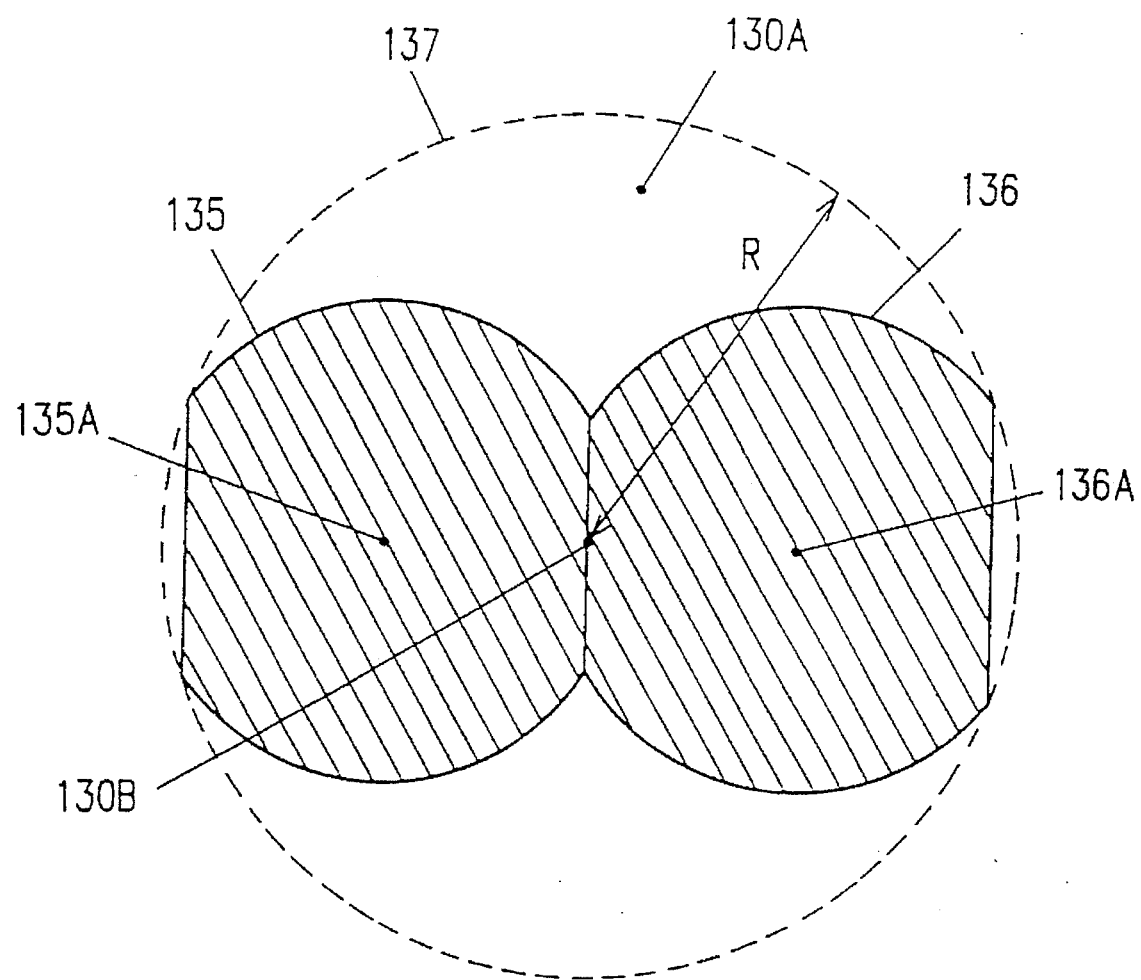
FIG. 4 is a schematic view of an arrangement of actual images of a plurality of luminous elements formed on an optical path of a light transmitting optical system.
Figure 5:
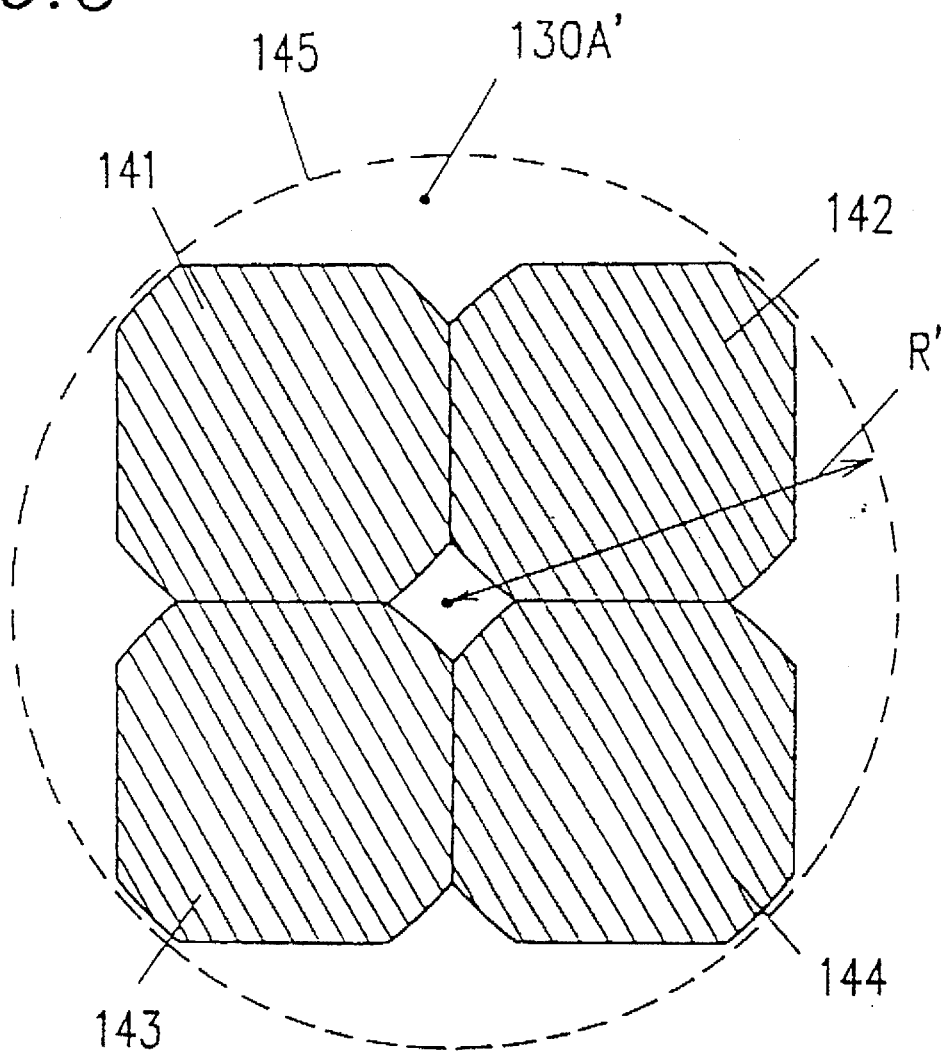
FIG. 5 is a schematic view of another arrangement of actual images of a plurality of luminous elements formed on an optical path of a light transmitting optical system.

FIG. 4 schematically shows an example of actual images 135 and 136 of the luminous elements of the metal halide lamps 121A and 122A formed on the principal plane 130A of the beam composing lens 130. The actual images 135 and 136 are formed to be adjoining to each other in a center 130B of the principal plane 130A and the vicinity thereof. The center 130B of the principal plane 130A is also the center of a circle 137 having a radius R in which the actual images 135 and 136 are inscribed. The light transmitting optical system 125 is preferably structured so as to minimize the radius R of the circle 137.

The first lenses 126 and 127 are formed to be appropriately decentered for this purpose. The first lens 126 refracts the light beam running along the optical axis of the light condensing optical system 121 to run along an optical axis 133, which passes through the center of gravity 135A of the actual image 135. The first lens 127 refracts the light beam running along the optical axis of the light condensing optical system 122 to run along an optical axis 134, which passes through the center of gravity 136A of the actual image 136. By appropriately selecting the direction in which and the extent by which the first lenses 126 and 127 are decentered, the actual images 135 and 136 can be arranged, appropriately on the principal plane 130A.

The light beams running along the optical axes 133 and 134 are further refracted by the beam composing lens 130 to run along optical axes 133A and 134A, are transmitted through the third lens 131, and cross each other in the center of the effective display area of the liquid crystal panel 4 and the vicinity thereof. In this manner, the light beams outgoing from the light condensing optical systems 121 and 122 are superimposed on the liquid crystal panel 4.

By structuring the light transmitting optical system 125 as is described above, the effective radius of the light beams passing through the principal plane 130A of the beam composing lens 130 can be shortened without substantially increasing the optical loss. Such a shortened effective radius reduces the cross section of the light beams passing through the entrance pupil 132A of the projection lens 132. Accordingly, a projection display apparatus having a high light utilization efficiency can be provided using a projection lens having a relatively large "F" number.

In the second example, four metal halide lamps may be used. In such a case, as is shown in FIG. 5, four actual images 141, 142, 143 and 144 are formed on the principal plane 130A' of the beam composing lens. The direction in which and the extent by which the first lenses are decentered are adjusted so as to minimize a radius R' of a circle 145 in which the actual images 141, 142, 143, and 144 are inscribed.

EXAMPLE 3

Figure 6:
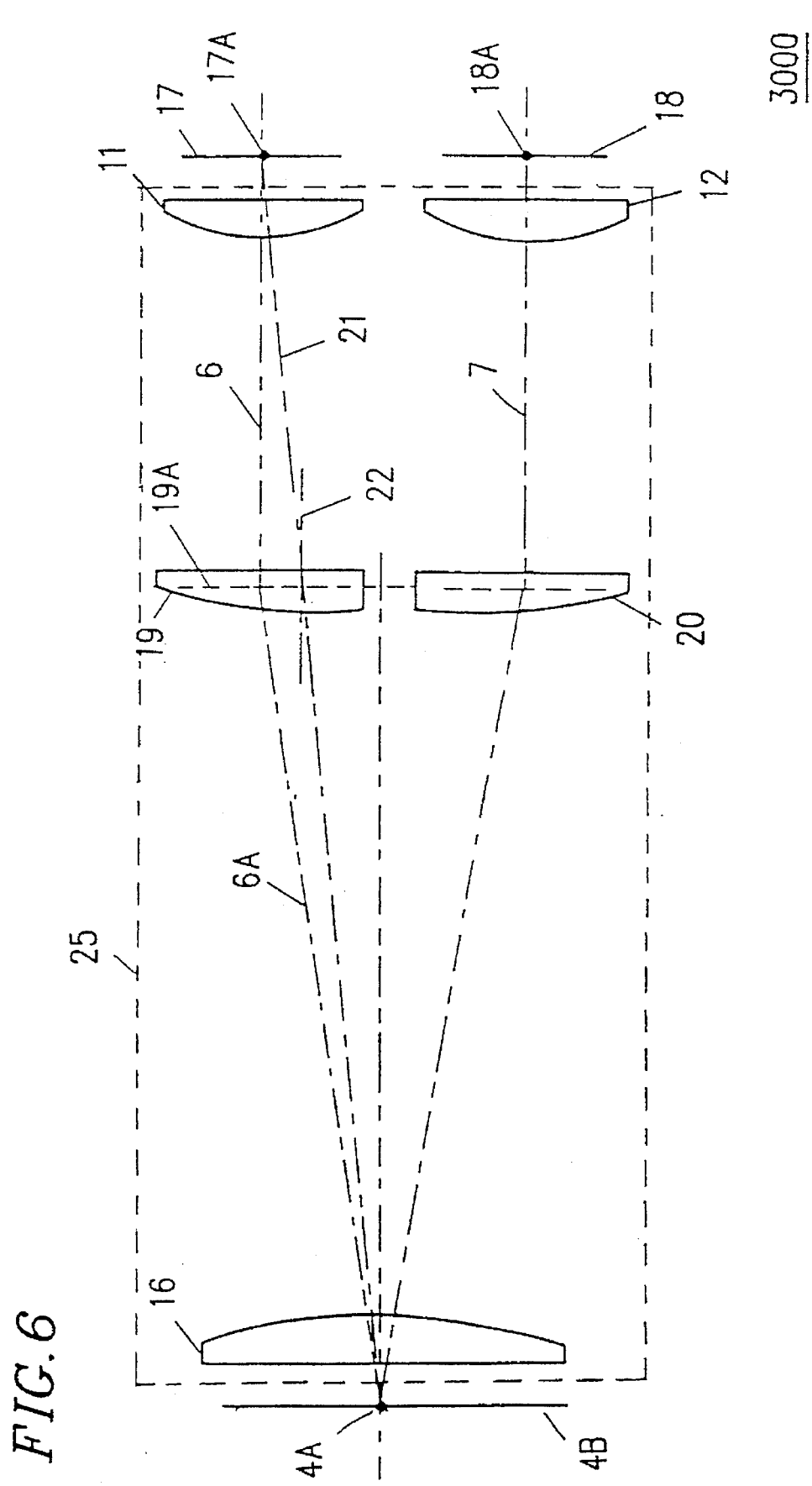
FIG. 6 is a schematic view of a light transmitting optical system for a projection display apparatus in a third example according to the present invention.

A projection display apparatus 3000 in a third example according to the present invention will be described with reference to FIG. 6.

The projection display apparatus 3000 in this example includes a light transmitting optical system 25 instead of the light transmitting optical system 3 used in the first example. The other elements are identical with those in the first example and bear the same reference numerals therewith.

The light transmitting optical system 25 includes the first lenses 11 and 12 and the third lens 16 which are identical with those in the first example. Second lenses 19 and 20 are included instead of the second lenses 13 and 14 and the beam composing lens By the light transmitting optical system 25, actual images of the objects 17 and 18 located on the principal planes of the first lenses 11 and 12 and the vicinity thereof respectively are formed on the effective display area 4B of the liquid crystal panel 4 in a superimposed state. The first lenses 11 and 12, which are located in the vicinity of the objects 17 and 18 respectively, are ignored for simplicity. The third lens 16, which is located in the vicinity of the images formed on the liquid crystal panel 4, is also ignored for simplicity.

The center 17A of the object 17 and the center 4A of the effective display area 4B are connected to each other by a phantom line 21. The second lens 19 is decentered so that an optical axis 22 will pass through the intersection of a principal plane 19A thereof and the phantom line 21. The second lens 20 is also decentered in the same manner. Because of such a decentered state of the second lens 19, the light beam running on the optical path 6 is refracted appropriately by the second lens 19 to run on the optical path 6A and reach the center 4A of the effective display area 4B. The light beam running on the optical axis 7 is refracted in the same manner and reaches the center 4A of the effective display area 4B.

Due to such a structure, the light transmitting optical system 25 functions in the same manner and achieves the same effects as the light transmitting optical system 3 without using the beam composing lens 15. Reduction in the number of the necessary lenses lowers production cost. Further, since the area of the optical surface is reduced, optical loss at the optical surface is also reduced. As a result, the light utilization efficiency of the light transmitting optical system is enhanced.

Even if the number of the light condensing optical systems increases, the same effects can be achieved. In detail, by appropriately selecting the direction in which and the extent by which the second lenses 19 and 20 are decentered, the light beams outgoing from the respective light condensing optical systems can be superimposed satisfactorily on the effective display area 4B of the liquid crystal panel 4.

In the first through third examples, a projection display apparatus for forming bright images on the screen can be structured easily, using a plurality of light sources. Moreover, light beams from the plurality of light sources are superimposed on the liquid crystal panel. Accordingly, even though the brightness of light and the color reproduction properties are non-uniform among different light sources, reduction in uniformity of brightness of light and color reproduction properties is restricted. As a result, the image formed on the screen by projection has advantageously sufficiently uniform brightness and color which are reproduced by uniform color reproduction properties. It is not absolutely necessary that the optical axes of the plurality of light condensing optical systems cross one another at a point exactly on the liquid crystal panel. The same effects are still achieved if only the cross sections of the light beams outgoing from the plurality of light condensing optical systems are substantially superimposed on the effective display area of the liquid crystal panel.

In the first example according to the present invention, the beam composing lens 15 may have a plane having a property for scattering light on the principal plane 15A and the vicinity thereof. In such a case, the uniformity in brightness and reproduction of colors of the image formed by projection can be improved efficiently. Such an effect can be achieved in a similar manner in the other previous examples.

It is generally known that light emitted by a luminous element of a metal halide lamp has relatively non-uniform luminance and color reproduction properties. A projection display apparatus including a lamp which has such a luminous element reduces the quality of the image formed on the screen by projection since the image has non-uniform brightness and colors. As a method for alleviating apparent non-uniformity in brightness and color reproduction properties of the luminous element, frosting the surface of the tube is known. However, such a method requires processing of a curved surface. Accordingly, it is relatively difficult to precisely adjust the scattering degree of light or to process the surface uniformly. Further, the production yield is lowered by defective frosting.

It is preferable to locate a glass substrate having a frosted surface in the vicinity of the principal plane 15A (FIG. 2) of the beam composing lens 15. By using such a structure, the light beams outgoing from the actual images of a plurality of luminous elements are scattered efficiently, thus alleviating the non-uniformity in brightness and colors of the image formed on the screen by projection. Since the surface to be frosted is flat, the frosting can be controlled to a precise degree precisely and sufficiently uniformly.

EXAMPLE 4

Figure 7:
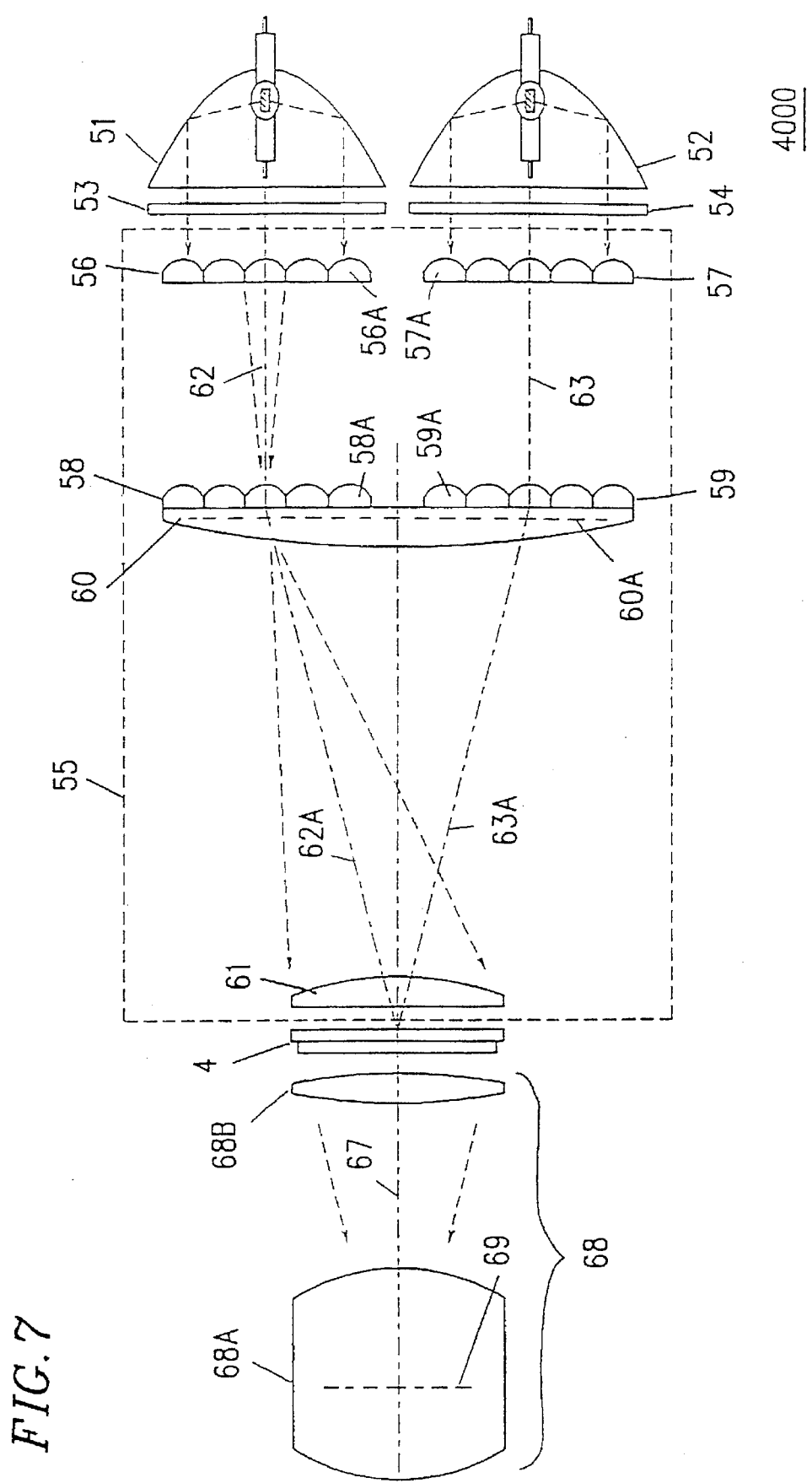
FIG. 7 is a schematic view of a projection display apparatus in a fourth example according to the present invention.

A projection display apparatus 4000 in a fourth example according to the present invention will be described with reference to FIGS. 7 through 10. The projection display apparatus 4000 also includes a plurality of light sources in order to obtain a bright and high quality image. FIG. 7 schematically illustrates a structure of the projection display apparatus 4000.

The projection display apparatus 4000 includes light condensing optical systems 51 and 52 each having a metal halide lamp and a parabolic mirror in the same manner as the light condensing optical systems 1 and 2 in the first example. In the projection display apparatus 4000, light beams outgoing from the light condensing optical systems 51 and 52 are transmitted to the liquid crystal panel 4 by a light transmitting optical system 55, and an optical image formed on the liquid crystal panel 4 is projected on a screen (not shown) by a projection lens 68. Reference numeral 67 denotes an optical axis of the projection lens 68. UV-IR cutting filters 53 and 54 are used for removing infrared rays and ultraviolet rays.

The light transmitting optical system 55 includes first lens arrays 56 and 57, second lens arrays 58 and 59, a beam composing lens 60, and a third lens 61. The first lens array 56 includes a plurality of first lenses 56A arranged two dimensionally. The first lens array 57 includes a plurality of first lenses 57A arranged two dimensionally. The second lens array 58 includes a plurality of second lenses 58A arranged two dimensionally. The second lens array 59 includes a plurality of second lenses 59A arranged two dimensionally. An optical axis 62 of the light condensing optical system 51 and an optical axis 63 of the light condensing optical system 52 are respectively refracted by the beam composing lens 60 to be optical axes 62A and 63A and cross with the optical axis 67 of the projection lens 68 on the liquid crystal panel 4.

Hereinafter, a detailed structure and the operation of the light condensing optical system 51, the first lens array 56, and the second lens array 58 will be described. The light condensing optical system 52, the first lens array 57, and the second lens array 59 have the same structure and operate in the same manner.

Figure 8A:
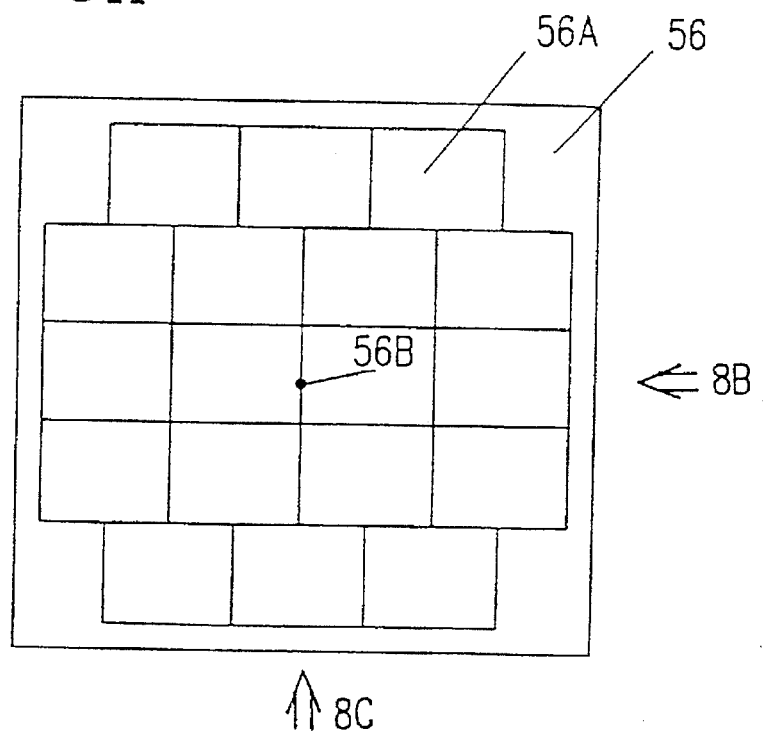
FIGS. 8A through 8C are schematic views illustrating the structure of a first lens array in a projection display apparatus according to the present invention.
Figure 8B:
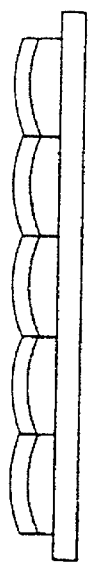
Figure 8C:

FIG. 8A is a plan view of the first lens array 56. FIG. 8B is a side view of the first lens array 56 shown in FIG. 8A seen from the direction 8B of FIG. 8A. FIG. 8C is a side view of the first lens array 56 shown in FIG. 8A seen from the direction 8C of FIG. 8A. As is described above, the first lens array 56 includes the plurality of first lenses 56A arranged two dimensionally. Each first lens 56A has a rectangular aperture. The first lenses 56A are each a planoconvex lens, and the convexed surface thereof are formed on the same plane as is shown in FIGS. 8B and 8C. The light beam outgoing from the light condensing optical system 51 generally has a circular cross section. Accordingly, the first lenses 56A are arranged to be inscribed in a circular aperture. For example, the first lens array 56 includes 18 lenses. The optical axis 62 passes through a point 56B corresponding to the center of gravity of the entire aperture of the first lens array 56.

Figure 9A:
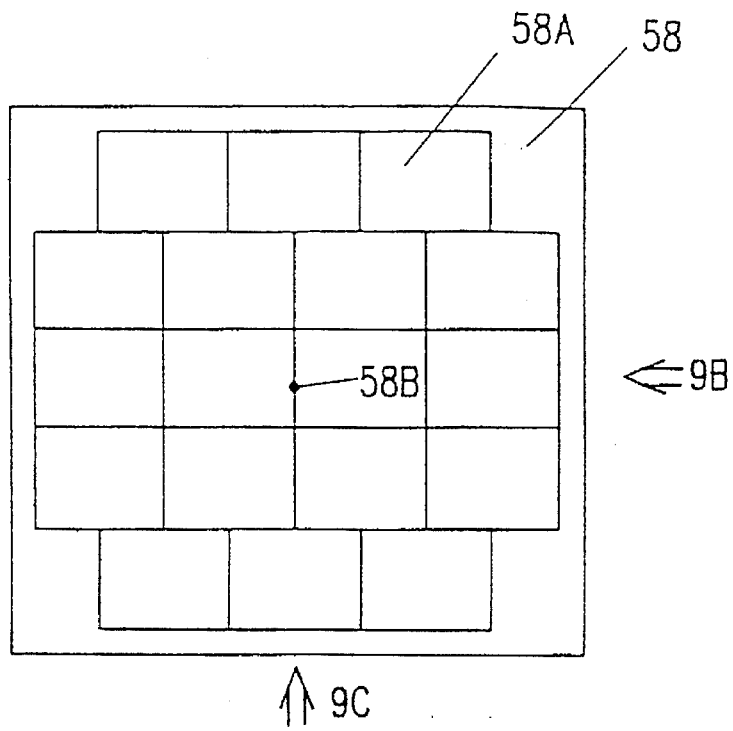
FIGS. 9A through 9C are schematic views illustrating a structure of a second lens array in a projection display apparatus according to the present invention.
Figure 9B:
Figure 9C:
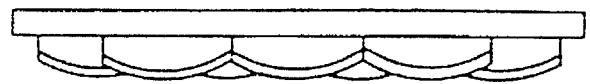

FIG. 9A is a plan view of the second lens array 58. FIG. 9B is a side view of the first lens array 56 shown in FIG. 9A seen from the direction 9B of FIG. 9A. FIG. 9C is a side view of the first lens array 56 shown in FIG. 9A seen from the direction 9C of FIG. 9A. The second lens array 58 includes the second lenses 58A provided in the same number as the first lenses 56A in the same manner. The second lenses 58A are each a planoconvex lens, and the convexed surface thereof are formed on the same plane as is shown in FIGS. 9B and 9C. Each one of the first lenses 56A and each one of the second lenses 58A form a pair. The optical axis 62 passes through a point 58B corresponding to the center of gravity of the entire aperture of the second lens array 58.

Figure 10:
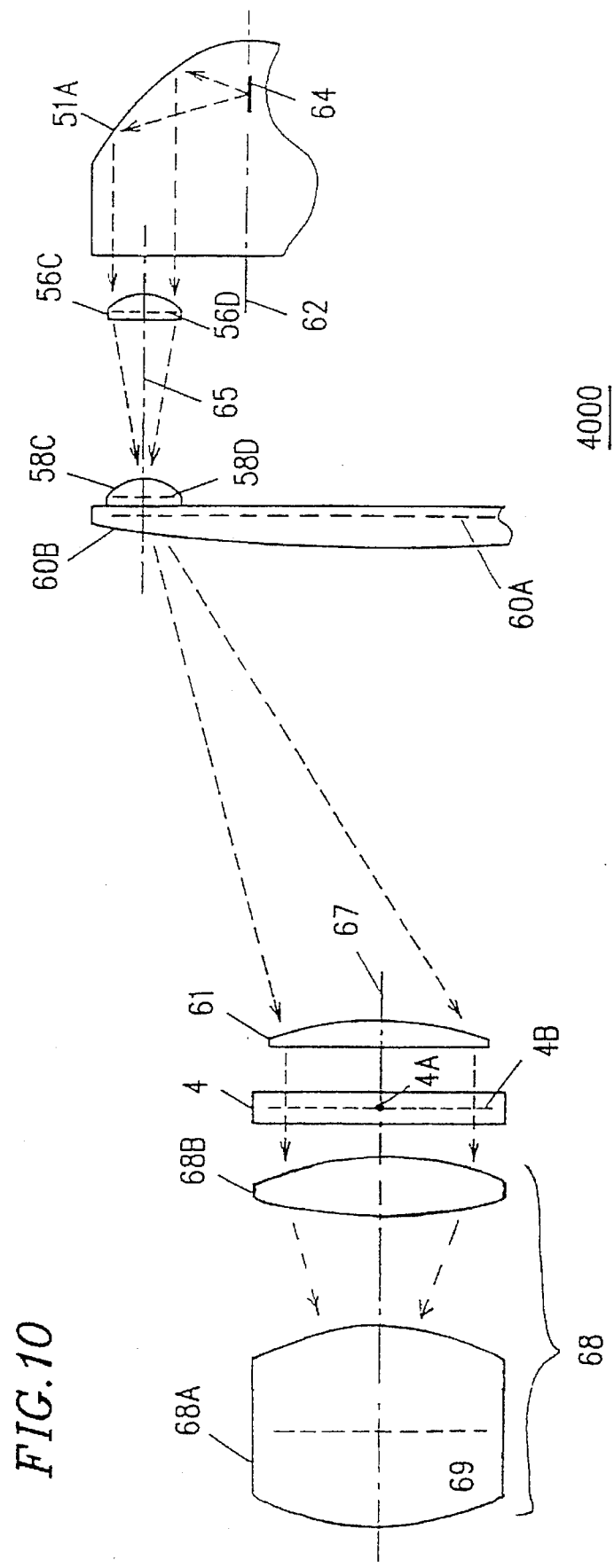
FIG. 10 is a schematic view illustrating a light transmitting optical system in the projection display apparatus shown in FIG. 7.

With reference to FIG. 10, the operation of the light transmitting optical system 55 will be described. As an example, the operation will be described regarding a pair of first lens 56C and second lens 58C.

Reference numeral 51A denotes a part of the parabolic mirror in the light condensing optical system 51, the reference numeral 62 denotes the optical axis of the light condensing optical system 51, and reference numeral 64 denotes a luminous element of the metal halide lamp in the light condensing optical system 51. Reference numeral 56C denotes one of the first lenses 56A, reference numeral 58C denotes one of the second lenses 58A, reference numeral 56D denotes a principal plane of the first lens 56C, reference numeral 58D denotes a principal plane of the second lens 58C, reference numeral 60A denotes a principal plane of the beam composing lens 60, and reference numeral 60B denotes a part of the beam composing lens 60. As is described above, reference numeral 61 denotes the third lens, and reference numeral 4B denotes the effective display area of the liquid crystal panel 4. The first lens 56C and the second lens 58C are located on the same optical axis 65, which is parallel to the optical axis 62.

The light emitted by the luminous element 64 is partially reelected by the part 51A of the parabolic mirror to run substantially parallel to the optical axis 62 and be incident on the first lens 56C as a light beam. The focus of the first lens 56C at which the light beams outgoing from the first lens 56C are focused is adjusted to be in the center of the corresponding second lens 58C and the vicinity thereof. By such a structure, the light beams passing through the first lens 56C are converged in the center of the second lens 58C and the vicinity thereof, and thus an actual image of the luminous element 64 is formed on the principal plane 58D of the second lens 58.

An image of an actual image of an object formed on the principal plane 56D is formed on the effective display area 4B of the liquid crystal panel 4 by the second lens 58C and the beam composing lens part 60B. The third lens 61, which is located in the vicinity of the image formed on the liquid crystal panel 4, is ignored for simplicity. The magnification ratio for forming the image on the effective display area 4B is fixed so that the cross section of the light beam incident on the first lens 56C will be magnified to the entire effective display area 4B. The beam composing lens part 60B appropriately refracts the light beam running along the optical axis 65 so as to reach the center 4A of the effective display area 4B.

By the optical system from the principal plane 60A of the beam composing lens 60 to an entrance pupil 69 of the projection lens 68, the principal plane 60A and the entrance pupil 69 are conjugate with each other. By such a structure, the light beam illuminating the effective display area 4B mostly reaches the entrance pupil 69. As a result, a projection display apparatus having a high light utilization efficiency can be realized.

The projection lens 68 includes a main lens group 68A and an assisting lens 68B located in the vicinity of the liquid crystal panel 4 so as to receive the light beams passing through the liquid crystal panel 4. An advantage of providing the assisting lens 68B is that the principal plane 60A of the beam composing lens 60 and the entrance pupil 69 are conjugated more easily.

The light beams outgoing from the assisting lens 68B are focused in the entrance pupil 69 and the vicinity thereof. The light beams to be incident on the third lens 61 are focused on the principal plane 60A of the beam composing lens 60 and the vicinity thereof. By such a structure, the light beam from the center of the principal plane 60A passes through the third lens 61, and then runs substantially parallel to the optical axis 67 and is incident on the liquid crystal panel 4. Then, such a light beam is incident on the assisting lens 68B and is converged in the center of the entrance pupil 69 and the vicinity thereof.

In general, a liquid crystal panel changes the display quality in accordance with the incident angle of the light. The above-described structure advantageously alleviates such a problem since the incident angle of light illuminating the effective display area 4B of the liquid crystal panel 4 is constant regardless of the incident position. As a result, an image having improved uniformity in display quality can be obtained by projection.

According to the above-described structure in the fourth example, the light beams outgoing from the light condensing optical systems 51 and 52 are respectively divided into a plurality of components by the first lens arrays 56 and 57. As a result, actual images of the luminous element of the light condensing optical system 51 are formed on a principal plane of the second lens array 58 in the same number as the plurality of components. In the same manner, actual images of the luminous element of the light condensing optical system 52 are formed on a principal plane of the second lens array 59 in the same number as the plurality of components. Each of the actual images are considered to be formed on the principal plane 60A of the beam composing lens 60. Each of the actual images illuminates the entire effective display area 4B in a superimposed state. The light beams from these actual images mostly reach the entrance pupil 69 of the projection lens 68 mainly due to the third lens 61 and the assisting lens 68B. In consequence, a projection display apparatus having a high light utilization efficiency can be obtained.

The light transmitting optical system 55 achieves additional effects when compared with the light transmitting optical system 3 in the first example as follows.

Generally, the cross section of the light beam outgoing from a parabolic mirror is relatively highly non-uniform in brightness. In the light transmitting optical system 55, the light beam outgoing from the light condensing optical system 51 is divided into a plurality of components by the first lens array 56. In the cross section of each of such components, the non-uniformity in brightness is significantly lower than that of the cross section of the entire light beam. The second lens array 58 appropriately magnifies each component which is incident thereon and transmits such components to the effective display area 4B. The components are superimposed on the effective display area 4B by the beam composing lens 60.

As is described above, a light beam having a relatively high non-uniformity in brightness is divided into a plurality of components having a relatively low non-uniformity in brightness and the plurality of components are superimposed on the liquid crystal panel 4. Accordingly, the uniformity in brightness of the obtained light is sufficiently high. Moreover, the light beams outgoing from the two light condensing optical systems 51 and 52 are superimposed on the effective display area 4B by the beam composing lens 60. In other words, the light beams having highly uniform brightness are superimposed, thereby further enhancing the uniformity in brightness. The image formed by projection by such an operation has a much improved display quality.

Figure 11:
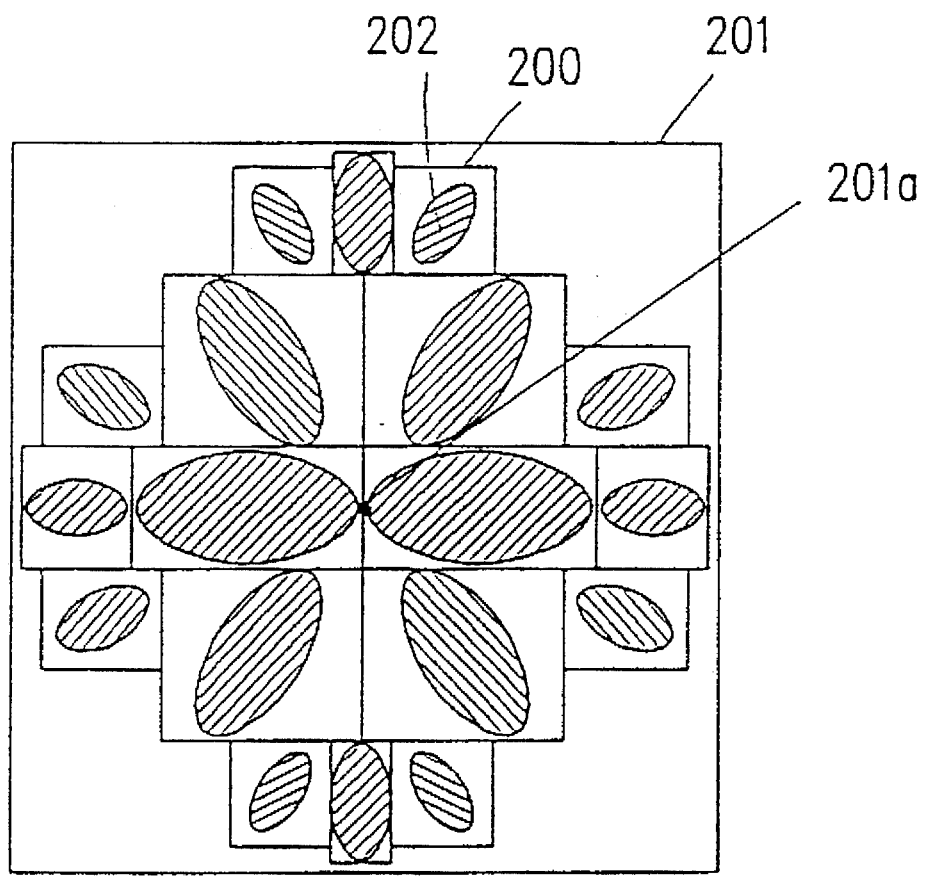
FIG. 11 is a schematic view illustrating another structure for a second lens array and actual images of a plurality of luminous elements in a projection display apparatus according to the present invention.

With reference to FIG. 11, a modification of the second lens array in the fourth example will be described. In this modification, the apertures of the second lenses have effectively different sizes in order to achieve a further effect.

The actual images of the luminous elements formed by the first lenses 56A are not of the same size. The sizes thereof are different in accordance with the height of the corresponding part of the light condensing optical system 51 from the optical axis 62. Accordingly, each lens of the second lens array preferably has an aperture which is sufficiently large for the corresponding actual image.

FIG. 11 illustrates a structure for a second lens array 201 in this modification. The second lens array 201 includes a plurality of second lenses 200 having effectively different sizes of apertures. Actual images 202 of the corresponding luminous elements are also illustrated. The optical axis 62 passes through a center 201A of the second lens array 201, and the actual images 202 closer to the center 201A are larger than the actual images 202 farther from the optical axis 201A.

The aperture of each second lens 200 is formed to be sufficiently large for the corresponding actual image 202, and the second lenses 200 are arranged around the center 201A in a concentrated state. By such a structure, the effective aperture of the second lens array 201 is reduced. If the second lens arrays 58 and 59 are replaced with a pair of second lens arrays having such a reduced effective aperture, the actual images of the luminous elements are formed in a reduced area on the principal plane 60A of the beam composing lens 60. In such a case, even if a projection lens having a relatively small entrance pupil is used, optical loss is not excessively large. The light utilization efficiency is significantly enhanced.

In the case that the second lens array 201 is used, the optical axes of the corresponding first lens and second lens do not necessarily correspond to each other. In such a case, it is effective to form the first lens so as to be appropriately decentered. The actual image of the luminous element formed by each first lens is generally on the optical axis thereof. Accordingly, by forming the first lens to be decentered so as to cause the optical axis thereof to pass through the center of the aperture of the corresponding second lens, the actual image of the corresponding luminous element can be formed in the center of the aperture of the corresponding second lens.

In other words, the actual images 202 in FIG. 11 can be formed in the center of the aperture of the second lenses 200 by forming the first lenses to be decentered in a prescribed direction by a prescribed extent.

It is more preferable to form the second lenses 200 to be decentered. As is appreciated from the third example, by forming the second lenses 200 to be appropriately decentered, the light beams passing therethrough can be superimposed on the liquid crystal panel 4 without using the beam composing lens 60. Each second lens 200 is formed to be decentered so that the light beam from the center of the aperture of the corresponding first lens will reach the vicinity of the center 4A of the effective display area 4B of the liquid crystal panel 4. In this way, the number of parts of the projection display apparatus can be reduced, and thus production cost thereof is reduced. Further, since the area of the optical surface is reduced, optical loss at the optical surface is also reduced, thus further improving the brightness of the image formed by projection.

In the fourth example, two metal halide lamps are used. Four metal halide lamps may be used. In such a case, a projection display apparatus for realizing an image which is four times brighter than an image formed by a projection display apparatus including only one lamp can be easily structured.

EXAMPLE 5

A projection display apparatus 5000 in a fifth example according to the present invention will be described with reference to FIGS. 12 through 14.

Figure 12:
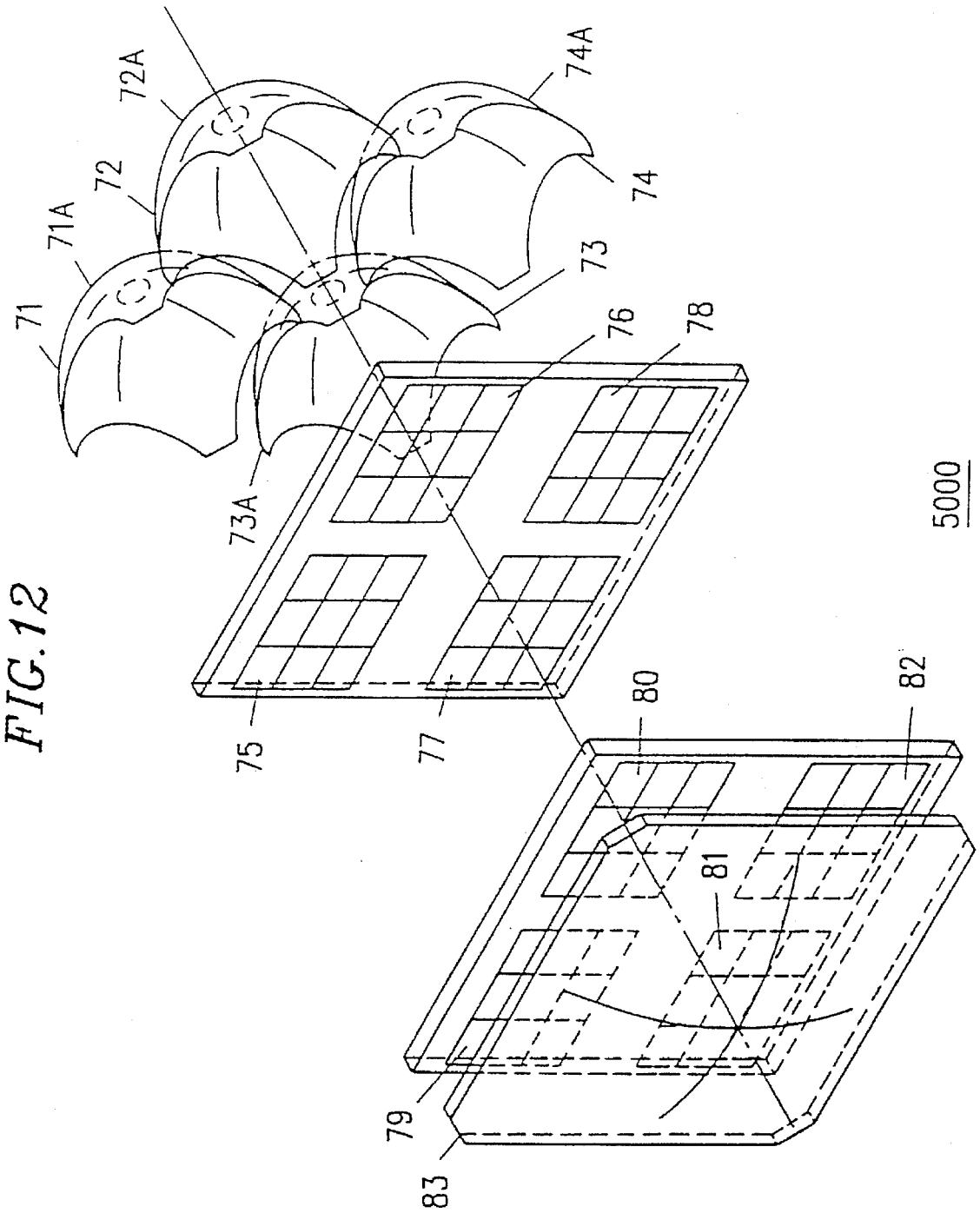
FIG. 12 is a schematic view of a plurality of light condensing optical systems and a part of a light transmitting optical system in a projection display apparatus in a fifth example according to the present invention.

FIG. 12 schematically illustrates a structure of the projection display apparatus 5000 including four metal halide lamps. The projection display apparatus 5000 includes four light condensing optical systems 71, 72, 73 and 74, four first lens arrays 75, 76, 77 and 78, second lens arrays 79, 80, 81 and 82, and a beam composing lens 83. The other elements are the same as those in the fourth example. Light from the beam composing lens 83 is radiated to the liquid crystal panel 4, and the image on the liquid crystal panel 4 is projected on a screen by the projection lens 68. A flat main plane of the beam composing lens 83 and the entrance pupil 69 of the projection lens 68 are substantially conjugate with each other, and thus the light from the beam composing lens 83 is mostly incident on the projection lens 68 effectively.

Reference numerals 71A, 72A, 73A and 74A denote parabolic mirrors of the respective light condensing optical systems 71 through 74. The metal halide lamps and the UV-IR cutting filters are omitted in FIG. 12 for simplicity.

The parabolic mirrors 71A, 72A, 73A and 74A are partially cut out in two directions perpendicular to each other so as to have a rectangular opening through which light is emitted. By such a shape, the light condensing optical systems 71 through 74 are conveniently located proximate to one another. Such an arrangement of the light condensing optical systems 71 through 74 allows the respective second lens arrays 79 through 82 to be located proximately to one another easily. In this manner, a plurality of actual images formed on the principal plane of the beam composing lens 83 can be restricted from expanding.

Preferably, the lens array 201 illustrated in FIG. 11 is used as each of the second lens arrays 79 through 82. In such a case, the first lens arrays are arranged, for example, as is shown in FIG. 13, and the second lens arrays are arranged, for example, as is shown in FIG. 14.

Figure 13:
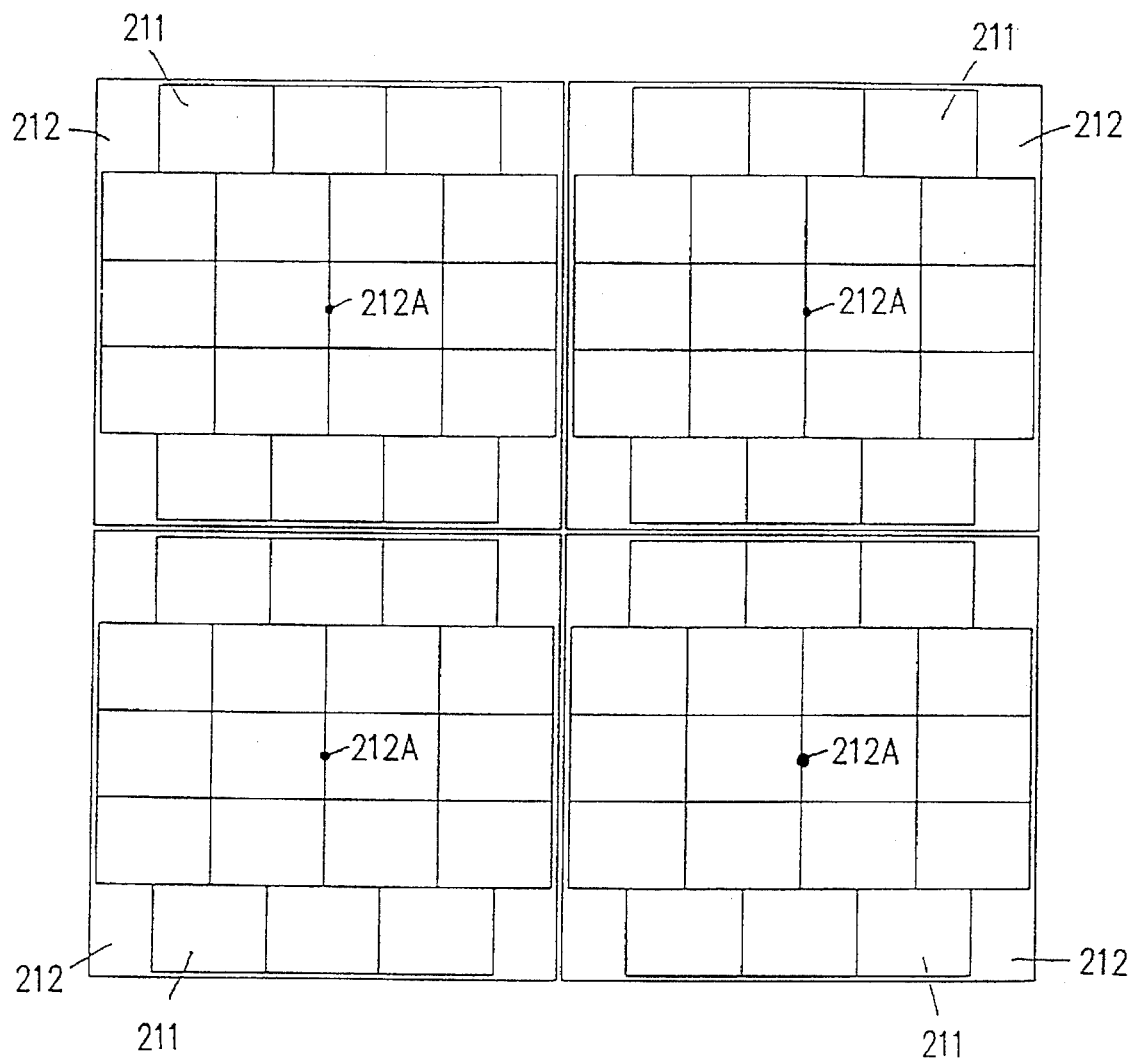
FIG. 13 is a schematic view illustrating another structure of a first lens array in a projection display apparatus according to the present invention.

As is illustrated in FIG. 13, first lens arrays 212 each include 18 first lenses 211 which are appropriately decentered. The first lens arrays 212 are arranged in a matrix of 2×2 and are used instead of the first lens arrays 75 through 78. Optical axes of the light condensing optical systems 71 through 74 pass through centers 212A of the first lens arrays 212.

Figure 14:
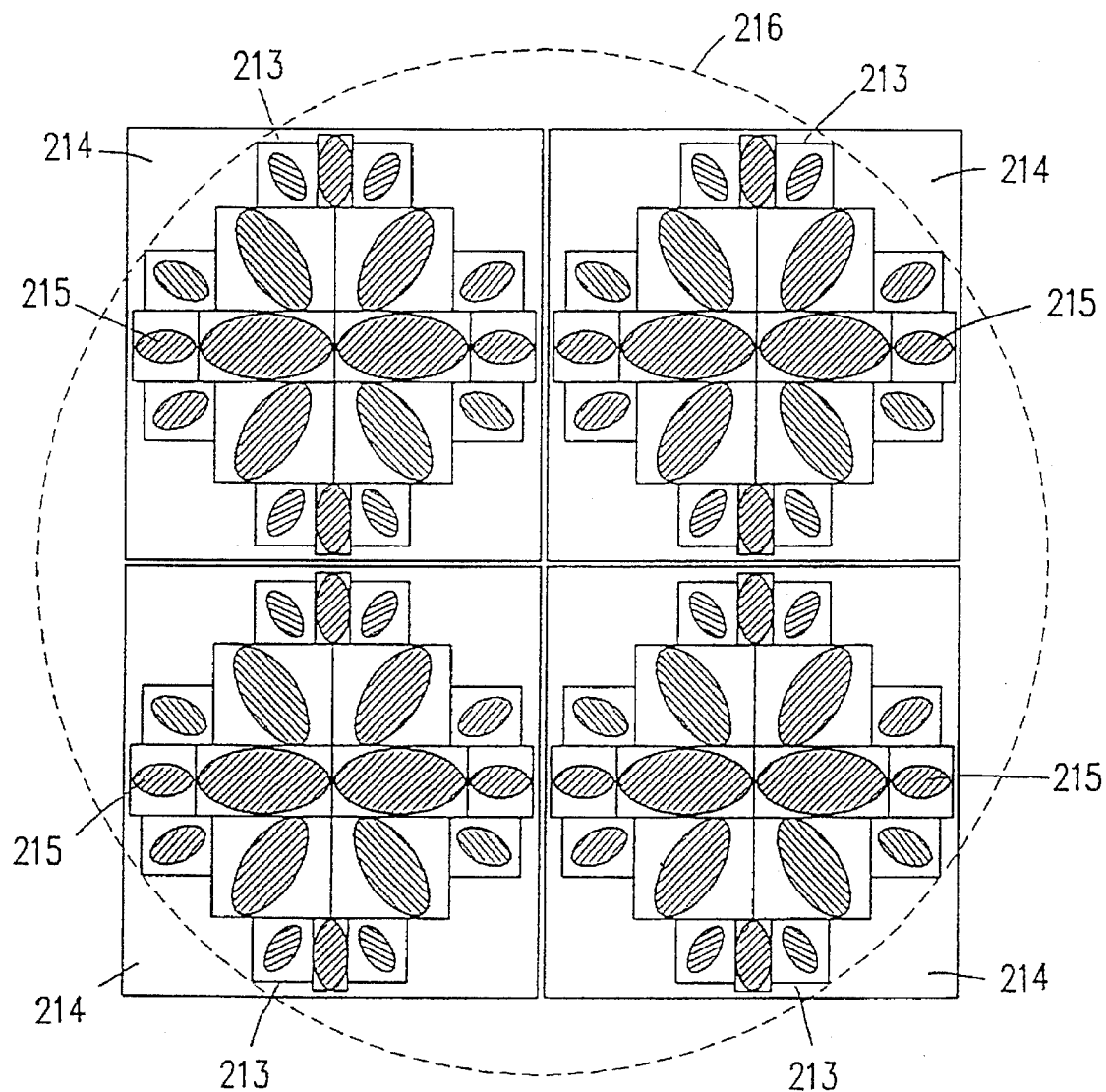
FIG. 14 is a schematic view illustrating still another structure of a second lens array and actual images of a plurality of luminous elements in a projection display apparatus according to the present invention.

As is illustrated in FIG. 14, second lens arrays 214 each include 18 second lenses 213 having apertures which are different from one another appropriately. The second lenses 213 are arranged around a center of each second lens array 214 in a concentrated state. The second lens arrays 214 are arranged in a matrix of 2×2 and are used instead of the second lens arrays 79 through 82. By structuring the first lens arrays 212 appropriately, actual images 215 of the plurality of luminous elements can each be formed in a central area of the aperture of the corresponding second lens 214 as is shown in FIG. 14.

According to the above-described structure, the actual images 215 of a plurality of luminous elements are inscribed on the principal plane of the beam composing lens 83 in a circle 216 indicated by dashed line in FIG. 14. By providing the circle 216 with a radius corresponding to the effective radius of the entrance pupil 69 of the projection lens 68, light beams from the actual images 215 all pass through the projection lens 68 effectively and reach the screen. Further, the actual images 215 are arranged so as to reduce the radius of the circle 216 to a minimum possible size. Accordingly, the effective radius of the entrance pupil 69 can be reduced.

The structure of the first lens arrays and the second lens arrays is not limited to the above-described one. By appropriately controlling the direction in which and the extent by which the first lenses are decentered, the plurality of actual images of the luminous elements can be arranged in a further concentrated state. By appropriately arranging the second lenses having appropriately different apertures in accordance with the size and the arrangement of the actual images, the radius of the circle 216 can still be reduced. As a result, a projection display apparatus losing less light can be realized in combination with a projection lens having a larger "F" number.

In the fourth and the fifth examples, the assisting lens 68B as a part of the projection lens 68 is preferably a Fresnel lens having a surface proximate to an aspherical surface. In such a case, an optical surface of the Fresnel lens which is closer to the liquid crystal panel 4 is a Fresnel lens surface. The reason will be given below.

In order to conjugate the principal plane 60A of the beam composing lens 60 and the entrance pupil 69 with each other, a light beam from the center of the principal plane 60A needs to reach the center of the entrance pupil 69 regardless of the height of the light beam passing through the liquid crystal panel 4 from the optical axis 67. In general, a spherical lens has spherical aberration. In order to easily cause the light beam from the center of the principal plane 60A to reach the center of the entrance pupil 69 as is described above using a minimum possible number of lenses, a lens having an aspherical optical surface to satisfactorily remove spherical aberration is required. Such an aspherical lens surface can be formed of plastic at a higher ease of processing and with a lower cost than a lens formed of glass.

In order to structure a projection display apparatus having a high luminous output, use of a liquid crystal panel having a larger effective display area is preferable because the liquid crystal panel is illuminated by light of a higher intensity. Since the optical energy concentrated in a unit area is reduced, heat generation by the liquid crystal panel is restricted more easily. The effective radius of the assisting lens 68B is determined by the diagonal length of the effective display area 4B of the liquid crystal panel 4. Accordingly, the effective radius increases by using a liquid crystal panel having a larger effective display area.

By forming a surface of a thin plastic plate into a Fresnel lens surface by press molding, a lens having an aspherical lens surface and a large effective diameter can be formed relatively easily and with relatively low cost.

The light beam passing through the assisting lens 68B is almost parallel to the optical axis 67 between the assisting lens 68B and the liquid crystal panel 4 and is converged toward the optical axis 67 between the assisting lens 68B and the main lens group 68A. By forming one of the surfaces of the assisting lens 68B opposed to the liquid crystal panel 4 into a Fresnel lens surface, the light beam passing through the assisting lens 68B is first refracted by the Fresnel lens surface and again refracted by the flat surface from which the light is outgoing. In this manner, the spherical aberration is compensated for more satisfactorily than by refracting the light only by the Fresnel lens surface.

Hereinafter, preferable modifications of the projection display apparatus in the first through fifth examples will be described.

It is preferable to form at least one of the surfaces of each lens included in the light transmitting optical system into an aspherical surface. By such a structure, optical loss caused by various aberrations is alleviated, thus to improve the light utilization efficiency of the light transmitting optical system. As a result, a brighter image is displayed by projection.

The total number of the luminous elements is preferably two, four, six, or nine. In general, two, four, six or nine lamps are combined with the same number of parabolic mirrors to form the same number of light condensing optical systems in the same manner as is described in the previous examples.

Use of two luminous elements is described in the first through fourth examples. Such a structure is advantageous in that the brightness can be doubled easily. Use of four luminous elements is also advantageous in that actual images of the luminous elements can be arranged in a matrix of 2×2 as is easily appreciated from FIGS. 5 and 14. The actual images of the luminous elements can be arranged highly efficiently in the state of being inscribed in the entrance pupil of the projection lens. Thus, the entrance pupil having a limited area can be used efficiently.

Use of six luminous elements allows the arrangement of the actual images of the luminous elements in a matrix of 2×3 or 3×2. Such a structure is advantageous in that the entrance pupil having a limited area can be utilized efficiently as in the case of using four luminous elements. Use of nine luminous elements allows the arrangement of the actual images of the luminous elements in a matrix of 3×3. Such a structure is also advantageous in that the entrance pupil having a limited area can be utilized efficiently.

Use of ten or more luminous elements is not preferable because of a complicated structure and an excessively large number of components. It is not preferable either to use the other number of luminous elements less than ten because the area of the entrance pupil which is not used effectively enlarges.

Figure 15:
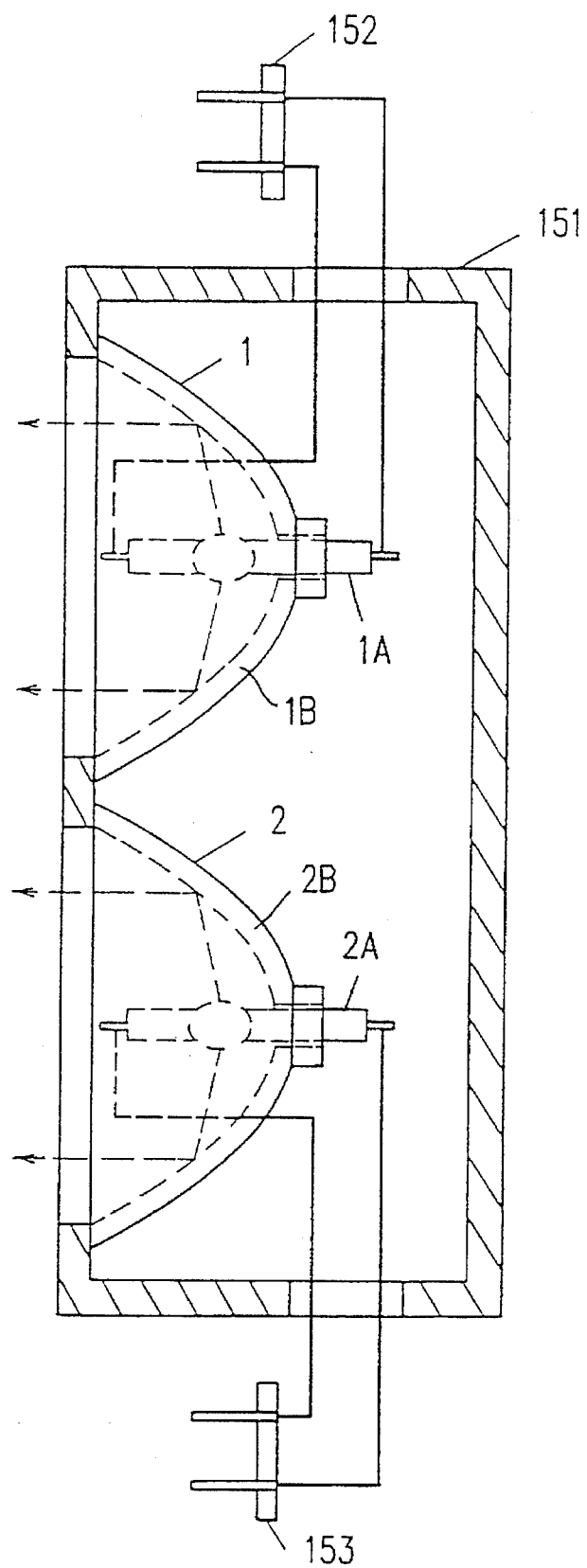
FIG. 15 is a schematic view of a lamp unit in the fifth example according to the present invention.

FIG. 15 shows a preferable structure of the two light condensing optical systems 1 and 2 in, for instance, the first example. In FIG. 15, the light condensing optical systems 1 and 2 act as lamp units. For simplicity, the light condensing optical systems 1 and 2 will be referred to also as lamp units 1 and 2, hereinafter. In the lamp unit 1, the metal halide lamp 1A connected to an electrode socket 152 and the parabolic mirror 1B are held in an integral state. In the lamp unit 2, the metal halide lamp 2A connected to an electrode socket 153 and the parabolic mirror 2B are held in an integral state.

The lamp units 1 and 2 are held by a frame 151 and located at a prescribed position in the projection display apparatus. The frame 151 is then fixed. Leads for supplying power to the metal halide lamps 1A and 2A are drawn outside the frame 151 and are connected to lighting circuits (not shown) through the electrode sockets 152 and 153, respectively. By preparing new lamp units held in another frame of the same type, a plurality of lamps can be replaced easily at one time through simple replacement of the frames.

In general, lamps used for such a purpose have a limited life; namely, the luminous output thereof lowers after being lit up over a certain period of time. Accordingly, lamps need to be replaced relatively frequently in a projection display apparatus using such lamps. According to the above-described structure using the frames, a plurality of lamps can be replaced at one time. Thus, the projection display apparatus is easy to use. Further, since the lamps are replaced while being integral with the parabolic mirrors, necessity of troublesome positional adjustment of lamps after lamp replacement is advantageously eliminated.

The same effects are obtained even with four, six or nine lamps. Lamp replacement is made easier by holding a plurality of lamp units by one frame. In order to use four lamps, two frames each holding two lamps may be used. Time and labor are alleviated when compared with replacing four lamps separately.

Figure 16:
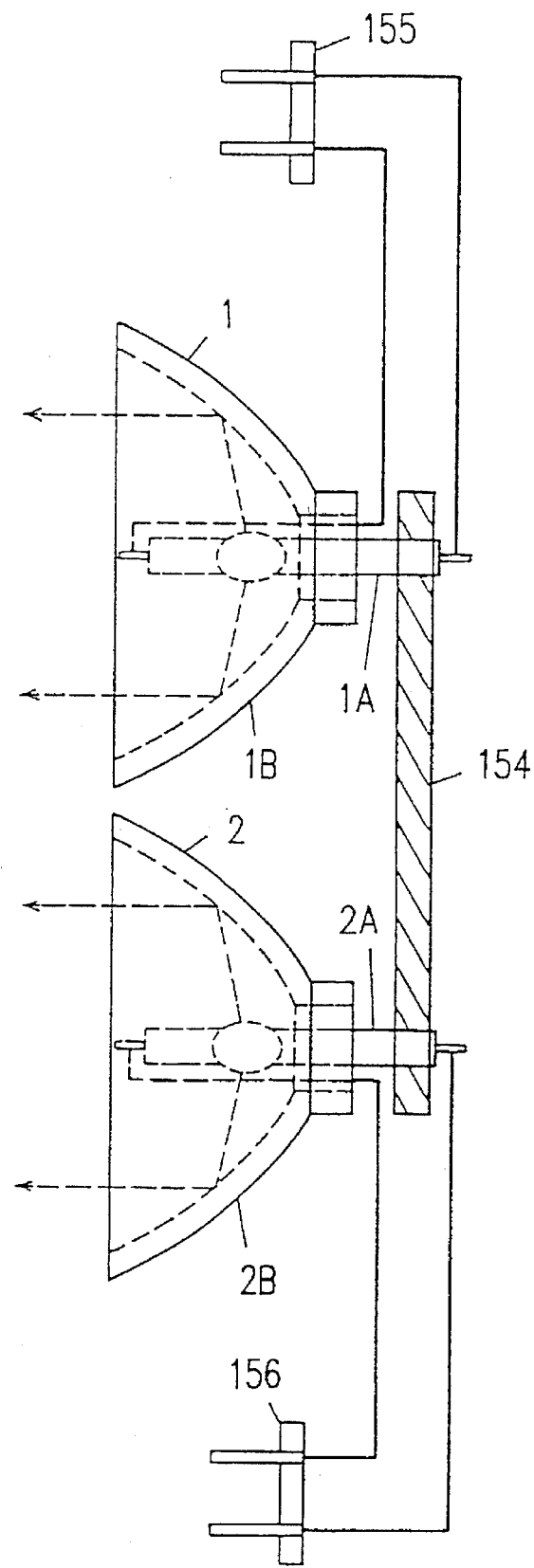
FIG. 16 is a schematic view of a lamp unit in a modification of the fifth example according to the present invention.

FIG. 16 shows another preferable structure of the two light condensing optical systems 1 and 2 in, for instance, the first example. In FIG. 16, the parabolic mirrors 1B and 2B have openings at apexes thereof, and the metal halide lamps 1A and 2A are inserted through the openings, respectively. The metal halide lamps 1A and 2A are fixed to a support 154. The support 154 is located at a prescribed position to locate the metal halide lamps 1A and 2A at prescribed positions with respect to the parabolic mirrors 1B and 2B. Leads for supplying power to the metal halide lamps 1A and 2A are drawn outside the parabolic mirrors 1B and 2B through the openings and are connected to lighting circuits (not shown) through appropriate electrode sockets 155 and 156, respectively.

By preparing two new lamp units fixed to another support of the same type, a plurality of lamps can be replaced easily at one time through simple replacement of the supports. Since only the lamps are replaced, lamp replacement is less costly when compared when the case of replacing the lamps together with the parabolic mirrors.

In the previous examples, each light condensing optical system includes a parabolic mirror. The present invention Is not limited to such a structure. The light condensing optical system may include an ellipsoid mirror, a concaved mirror having a different shape, a condenser lens or the like instead of the parabolic mirror. Especially, a concaved mirror such as a parabolic mirror or an ellipsoid mirror is advantageous in that the solid angle at which the light can be condensed is sufficiently large to condense the light emitted by the luminous element efficiently. Thus, a projection display apparatus having a high light utilization efficiency can be realized.

In the previous examples, a transmission type liquid crystal panel is used as the light valve. The present invention is not limited to such a structure. The light valve may be of any other type as far as light is modulated spatially to form an optical image. For example, a reflective light valve may be used.

In the case that a liquid crystal panel is used as a light valve, a liquid crystal panel including pixel electrodes arranged in a matrix and using a twisted nematic liquid crystal material may be used. By arranging the pixel electrodes more precisely and at a higher density and driving such a liquid crystal panel by an active matrix system using a switching device such as a transistor formed in correspondence with each pixel, a highly precise image with a high contrast can be formed.

A twisted nematic liquid crystal panel utilizes polarization of light. Accordingly, when natural light is incident, approximately 50% of the light is lost. In general, as the precision of the pixel structure is raised, the aperture ratio lowers and thus optical loss increases. Such a liquid crystal panel does not have a sufficiently high light transmittance and is not preferable for forming a bright image by projection. However, when used in combination with a projection display apparatus according to the present invention, even such a liquid crystal panel realizes a sufficiently bright image by projection. The reason is that a very large luminous output is obtained in a projection display apparatus according to the present invention. The quality of the image can be significantly enhanced.

Instead of the metal halide lamps used in the previous examples, halogen lamps, xenon lamps or the like may be used.

A metal halide lamp is suitable for the projection display apparatus according to the present invention because of a high luminous efficacy and satisfactory color reproduction properties thereof. In general, luminance of light and color reproduction properties of different metal halide lamps are non-uniform. For this reason, in the case when the liquid crystal panel is illuminated by light from a plurality of metal halide lamps, such non-uniform luminance of light and color reproduction properties causes non-uniformity in light on the light receiving surface. Thus, the quality of the image formed by projection lowers. In a projection display apparatus according to the present invention, however, light emitted by different lamps is transmitted to the liquid crystal panel as light beams in a superimposed state. Accordingly, the non-uniformity in luminance and color reproduction properties does not influence the image formed by projection, thus raising the quality of the image.

More preferably, a metal halide lamp having a luminous element which contains dysprosium (hereinafter, referred to as "Dy") and neodymium (hereinafter, referred to as "Nd") is used. For a projection display apparatus for displaying a video image obtained by, for example, a TV signal, a high color purity of RGB colors is demanded. A projection display apparatus used for such a purpose needs to include a lamp which has high color reproduction properties. In order to obtain a large luminous output, a lamp having a high luminous efficacy is needed.

Figure 17:
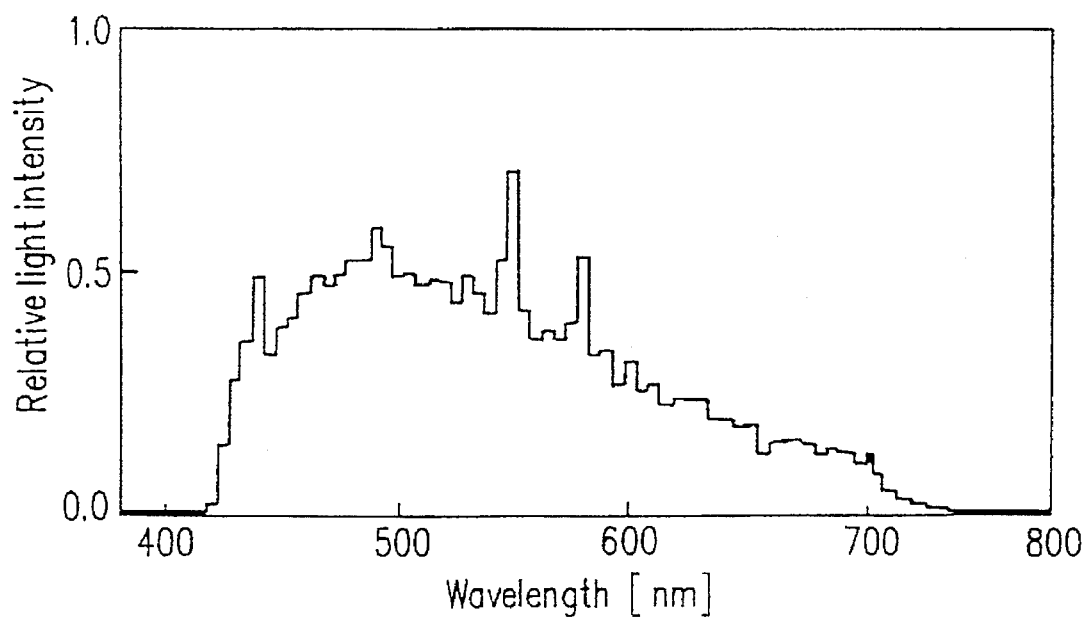
FIG. 17 is a graph illustrating an emission spectrum of a metal halide lamp.

FIG. 17 illustrates an emission spectrum of a metal halide lamp containing mainly iodides of Dy and Nd. The arc length is 6 mm, and the power of the lamp is 250 W. As is appreciated from FIG. 17, light emitting components are shown in abundance continuously over the entire visible light range. Accordingly, satisfactory color reproduction properties can be obtained in a wide range of wavelengths. The luminous flux is approximately 20,000 lumens. The luminous efficacy is as high as approximately 80 lumens/W. Accordingly, such a lamp is suitable for a projection display apparatus.

Today, such a metal halide lamp having a power of approximately 120 to 250 W and an arc length of 3 to 7 mm is used in practice. A metal halide lamp having a high level of power such as 500 W or 1 kW, a satisfactory emission spectrum and a relatively short arc length is very special, and thus is not suitable for a projection display apparatus. According to the present invention, a projection display apparatus having a large luminous output can be realized using two or four metal halide lamps as described above having a large luminous output.

Figure 18:
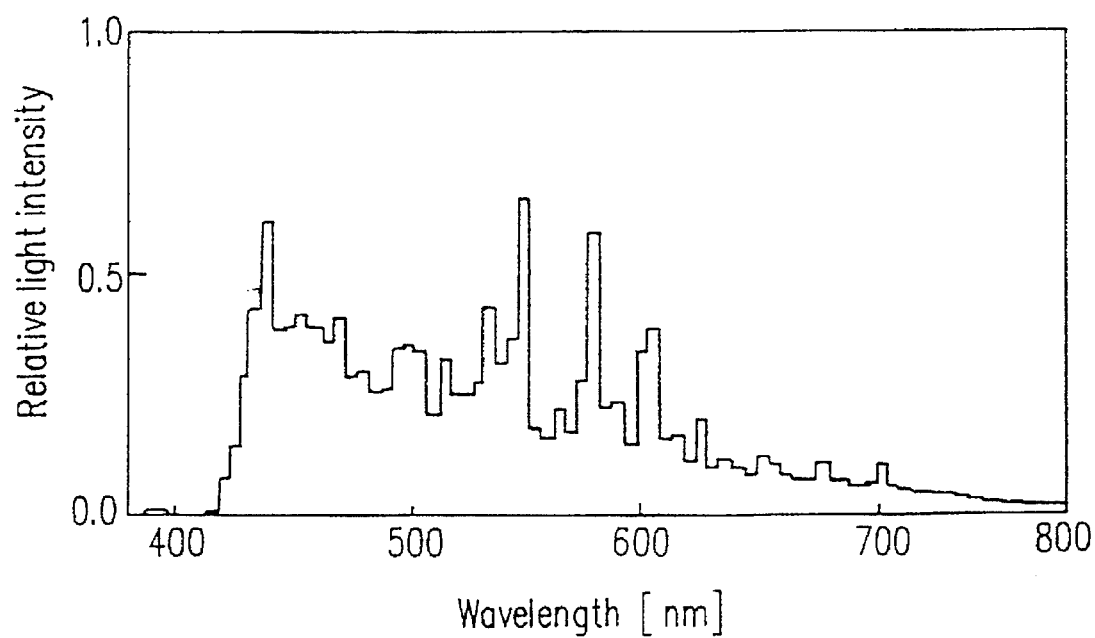
FIG. 18 is a graph illustrating another emission spectrum of a metal halide lamp.

Alternatively, a metal halide lamp including a luminous element which contains gadolinium (hereinafter, referred to as "Gd") and lutetium (hereinafter, referred to as "Lu") may be used. FIG. 18 illustrates an emission spectrum such a metal halide lamp. As is appreciated from FIG. 18, light emitting components are shown in abundance continuously over the entire visible light range. Accordingly, satisfactory color reproduction properties can be obtained In a wide range of wavelengths. The luminous efficacy is sufficiently high for practical use.

Figure 19:
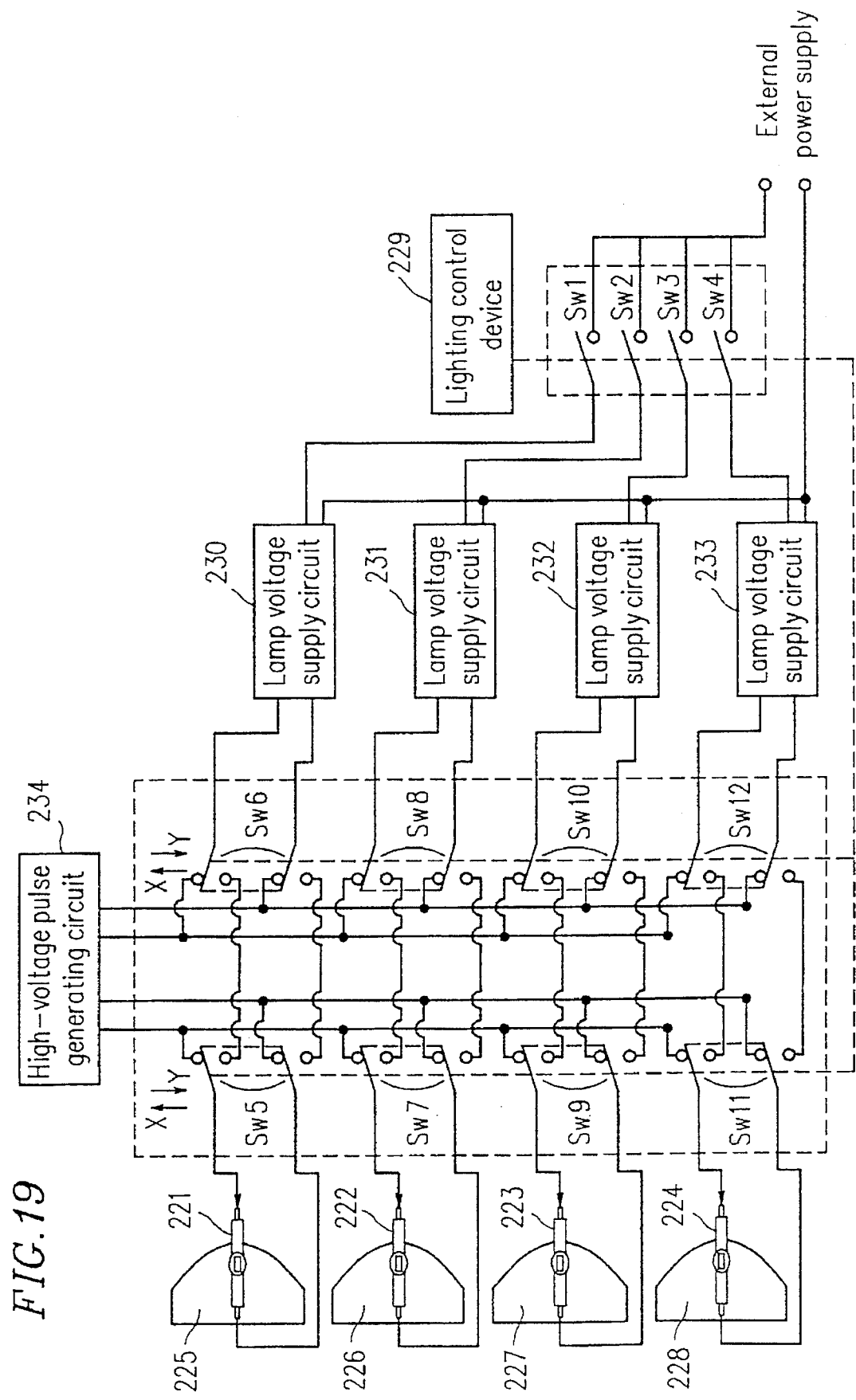
FIG. 19 is a circuit diagram for lighting a plurality of metal halide lamps.

With reference to FIG. 19, a preferable lighting circuit for lighting up four metal halide lamps in the case when such lamps are used in a projection display apparatus will be described.

In FIG. 19, four light condensing optical systems 225, 226, 227 and 228 respectively including four metal halide lamps 221, 222, 223 and 224 and four parabolic mirrors are illustrated linearly for simplicity. The light condensing optical systems 225, 226, 227 and 228 are arranged, for example, in a matrix of 2×2 when used as is described in the fifth example.

Lighting circuits for lighting up the metal halide lamps 221, 222, 223 and 224 mainly include one lighting control device 229, four lamp voltage supply circuits 230, 231, 232 and 233, one high-voltage pulse generating circuit 234, and electronic switches SW1 through SW12. The electronic switches SW1 through SW12 electronically control connections of the lighting circuit in accordance with a control signal sent from the lighting control device 229. Such electronic switches can switch the connection within approximately several milliseconds. Since a metal halide lamp generally maintains arc discharge even if power supply is stopped for several milliseconds, no problem occurs. Accordingly, insertion of the electronic switches SW1 through SW12 does not pose any specific problem in obtaining the following functions.

In general, a metal halide lamp needs to be supplied with a high voltage pulse to start up. The power of the lamp during normal operation is, for example, approximately 90 V. In order to start lighting the lamp, a pulse having a voltage of as high as several kilovolts needs to be applied to the lamp only during a short period of time to start arc discharge. The lamp voltage supply circuits 230 through 233 respectively correspond to the metal halide lamps 221 through 224, and supply voltages to the corresponding metal halide lamp for normal operation. The high-voltage pulse generating circuit 234 receives power from the lamp voltage supply circuits 230 through 233 and thus generates a high-voltage pulse required to start up the metal halide lamps 221 through 224. The high-voltage pulse generating circuit 234 is inserted either between the lamp voltage supply circuit 230 and the metal halide lamp 221, between the lamp voltage supply circuit 231 and the metal halide lamp 222, between the lamp voltage supply circuit 232 and the metal halide lamp 223, or between the lamp voltage supply circuit 233 and the metal halide lamp 224 through the electronic switches SW1 through SW12.

In order to light up the metal halide lamp 221, for example, the electronic switches SW5 and SW6 are connected to the side indicated by letter X in FIG. 19, and the electronic switches SW7 through SW12 are connected to the side indicated by letter Y. In such a state, the lamp voltage supply circuit 230 is connected to the metal halide lamp 221 through the high-voltage pulse generating circuit 234. By closing the electronic switch SW1 in this state, power is supplied to the lamp voltage supply circuit 230 and to the high-voltage pulse generating circuit 234, and thus the high-voltage pulse generating circuit 234 applies a high-voltage pulse to the metal halide lamp 221, thereby starting arc discharge.

After the metal halide lamp 221 goes into normal operation, the high-voltage pulse generating circuit 234 is not necessary. Accordingly, the electronic switches SW5 and SW6 are switched to the side indicated by letter Y to disconnect the high-voltage pulse generating circuit 234 from the circuit for the metal halide lamp 221. Thus, the lamp voltage supply circuit 230 is directly connected to the metal halide lamp 221, thereby continuing light emission.

The above-described operation is repeated to light up the other metal halide lamps 222 through 224. A series of such operations is performed through appropriate control of the electronic switches SW1 through SW12 conducted by the lighting control device 229.

The above-described structure is advantageous in that it is not necessary to prepare high-voltage pulse generating circuits in the same number as that of the metal halide lamps. In general, a high-voltage pulse generating circuit is expensive and relatively large. By contrast, electronic switches are inexpensive and small. Accordingly, a compact lighting circuit can be realized with low cost by the above-described structure.

The above-described lighting circuit may be used for lighting up any other number of lamps. Two or more high-voltage pulse generating circuits may be included. The same effects can be obtained as far as a plurality of lamps share one high-voltage pulse generating circuit.

EXAMPLE 6

Figure 20:
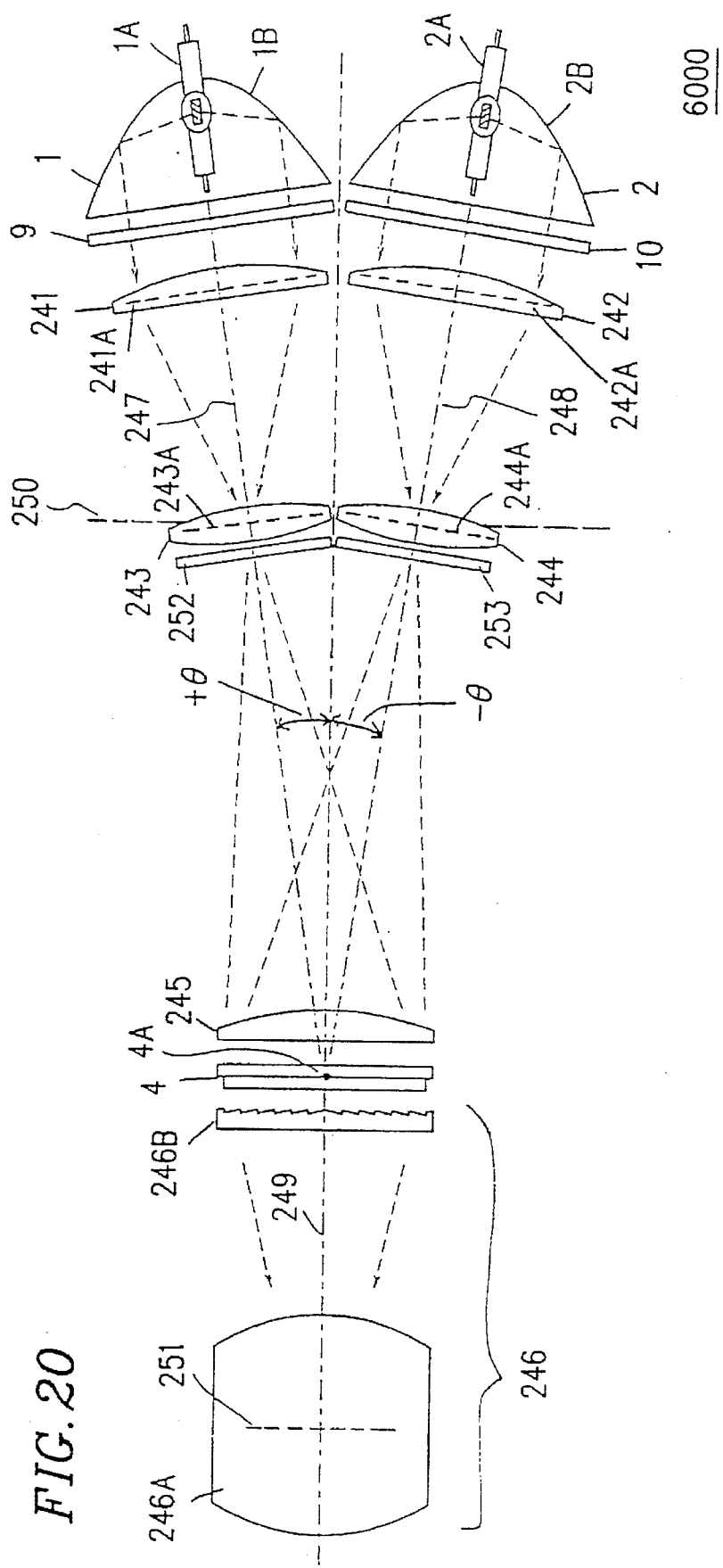
FIG. 20 is a schematic view of a projection display apparatus in a sixth example according to the present invention.

With reference to FIG. 20, a projection display apparatus 6000 in a sixth example according to the present invention will be described. The projection display apparatus 6000 is modified over the projection display apparatus 1000 in the first example.

In FIG. 20, the metal halide lamps 1A and 2A, the parabolic mirrors 1B and 2B, the light condensing optical systems 1 and 2, the UV-IR cutting filters 9 and 10, and the liquid crystal panel 4 are the same as those in the first example. First lenses 241 and 242, second lenses 243 and 244, a third lens 245, and a projection lens 246 function in the same manner as the corresponding elements in the first example. The projection lens 246 includes a main lens group 246A and a Fresnel lens 246B located on the surface of the liquid crystal panel 4 from which the light beams go out.

The first lens 241 converges light emitted by the light condensing optical system 1 on a principal plane 243A of the second lens 243. The second lens 243 converges an actual image of an object formed on a principal plane 241A of the first lens 241 onto the effective display area 4B of the liquid crystal panel 4. The magnification ratio of the first lens 241 is determined so that the light beam transmitted through the first lens 241 will illuminate the entire effective display area 4B. The first lens 242 and the second lens 244 function in the same manner.

The first lens 241 and the second lens 243 are arranged so that optical axes thereof will be on an optical axis 247 of the light condensing optical system 1. The first lens 242 and the second lens 244 are arranged so that optical axes thereof will be on an optical axis 248 of the light condensing optical system 2. The optical axes 247 and 248 are the axes of revolutionary symmetry for the parabolic mirrors 1B and 2B. The optical axes 247 and 248 cross each other on the effective display area 4B when extended. The optical axis 247 makes an angle +θ with an optical axis 249 of the projection lens 246. The optical axis 248 makes an angle −θ with the optical axis 249 of the projection lens 246. Signs + and − are used for convenience.

Due to the above-described structure, light beams outgoing from the plurality of light condensing optical systems can be transmitted to the liquid crystal panel 4 in a superimposed state without using the beam composing lens 15 used in the first example. In the above-described example, the light condensing optical system 1, the UV-IR cutting filter 9, the first lens array 241, and the second lens array 243, which are arranged on the same, single optical axis, form one light source unit. The light condensing optical system 2, the UV-IR cutting filter 10, the first lens array 242, and the second lens array 244, which are arranged on the same, single optical axis, form one light source unit. By preparing a plurality of such light source units, a projection display apparatus for displaying a bright image can be structured very easily.

Generally, the optical path from the second lens 243 or 244 to the third lens 245 is longer than the clear aperture of the second lens 243 or 244. Accordingly, the angle θ between the optical axis of each light source unit and the optical axis of the projection lens 246 is as small as approximately 5°. Due to such a small angle, the principal planes 243A and 244A of the second lenses 243 and 244 can be regarded to be on the same plane 250 for simplicity, and thus the actual images of the plurality of luminous elements can be regarded to be formed on the plane 250.

The third lens 245 and the Fresnel lens 246B allow the plane 250 and an entrance pupil 251 of the projection lens 246 to be conjugate with each other. Accordingly, the light beams from the plurality of actual images on the plane 250 reach the entrance pupil 251 effectively. The light beams from the plurality of light source units are transmitted to the projection lens 246 without significant loss and thus are used efficiently. As a result, the image formed on the screen (not shown) by projection is extremely bright.

In FIG. 20, two metal halide lamps 1A and 2A are used. Any other number of lamps may be used.

For example, in the case when four metal halide lamps are used, the projection display apparatus includes four identical light condensing optical systems, four identical UV-IR cutting filters, four identical first lenses, and four identical second lenses. Each one of the different elements are arranged to have the same optical axis, and thus four light source units are formed. The four light source units are arranged in a matrix of 2×2 so that the optical axes thereof will cross one another on the effective display area 4B of the liquid crystal panel 4. In this manner, a projection display apparatus having a large luminous output can be structured easily.

In the sixth example, the light source units are arranged so that the actual images of the plurality of luminous elements will be substantially inscribed in a circle on the plane 250. The circle is preferably as small as possible. In order to realize such a small circle, the angle e made by each of the optical axes 247 and 248 and the optical axis 249 is preferably as small as possible. If necessary, outer profiles of the pair of first lenses 241 and 242, the pair of second lenses 243 and 244, or the pair of parabolic mirrors 1B and 2B can be cut off in order to avoid physical contact with each other. If necessary, the first lenses 241 and 242 may be formed to be decentered to form the actual images of the plurality of luminous elements closer to each other.

In general, a liquid crystal panel is vulnerable against heat, and a material of the liquid crystal panel changes over time when illuminated by ultraviolet rays. Accordingly, it is necessary to remove infrared rays and ultraviolet rays from the light for illuminating the liquid crystal panel. The UV-IR cutting filters 9 and 10 are provided for this purpose. It is more preferable to provide a plurality of relative small UV-IR cutting filters which respectively cover the optical paths of the plurality of light condensing optical systems than providing one large UV-IR cutting filter which covers the entire optical paths of all the light condensing optical systems. Although the number of components increases, the effective area of each UV-IR cutting filter reduces and thus the production cost can be reduced.

A UV-IR cutting filter is formed of, for example, an interference filter which includes thin layers on a glass substrate formed by evaporation coating. The production cost of such an interference filter heavily depends on the production yield. The production cost is higher when a plurality of small filters are used than when one large filter is used.

The projection display apparatus 6000 preferably includes color compensating filters 252 and 253 on the optical axes of the light condensing optical systems. Light passing through the color compensating filters 252 and 253, for example, has the spectral transmittance illustrated in FIG.

21. The color compensating filter which provides such an emission spectrum is formed by evaporation coating of a plurality of layers on a glass substrate in the same manner as the UV-IR cutting filters. Such color compensating filter mainly removes light components having wavelengths corresponding to cyan and yellow colors from the illuminating light.

Figure 21:
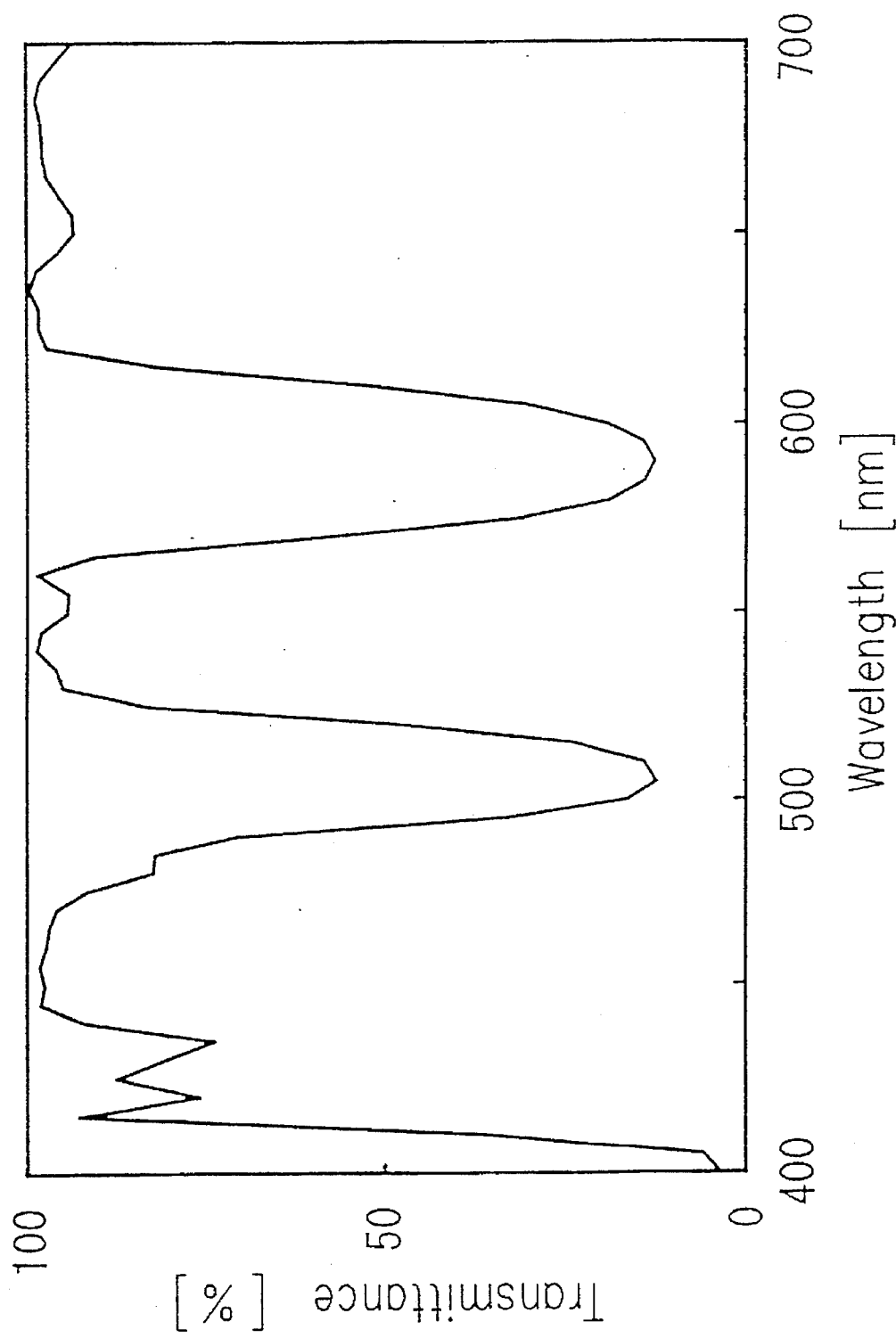
FIG. 21 is a graph illustrating a spectral transmittance of a color compensating filter.

A high color reproduction properties are demanded for a liquid crystal panel used for displaying general TV images of the NTSC system. The illuminating light needs to include highly pure-red, blue and green light components. The light compensating filter having the emission spectrum shown in FIG. 21 is advantageous in removing the unnecessary cyan and yellow light components from the illuminating light. By such a light compensating filter, the purity of each of the RGB color components of the illuminating light is improved to enhance the quality of the image displayed on the screen.

Provision of a plurality of color compensating filters for the respective light condensing optical systems is more preferable to provision of one large color compensating filter. Although the number of the components increases, the effective area of each filter is reduced and thus the production cost is lowered for the same reason as described above.

EXAMPLE 7

A projection display apparatus 7000 in a seventh example of the present invention will be described with reference to FIG. 22. The projection display apparatus 7000 is modified over the projection display apparatus 4000 in the fourth example.

Figure 22:
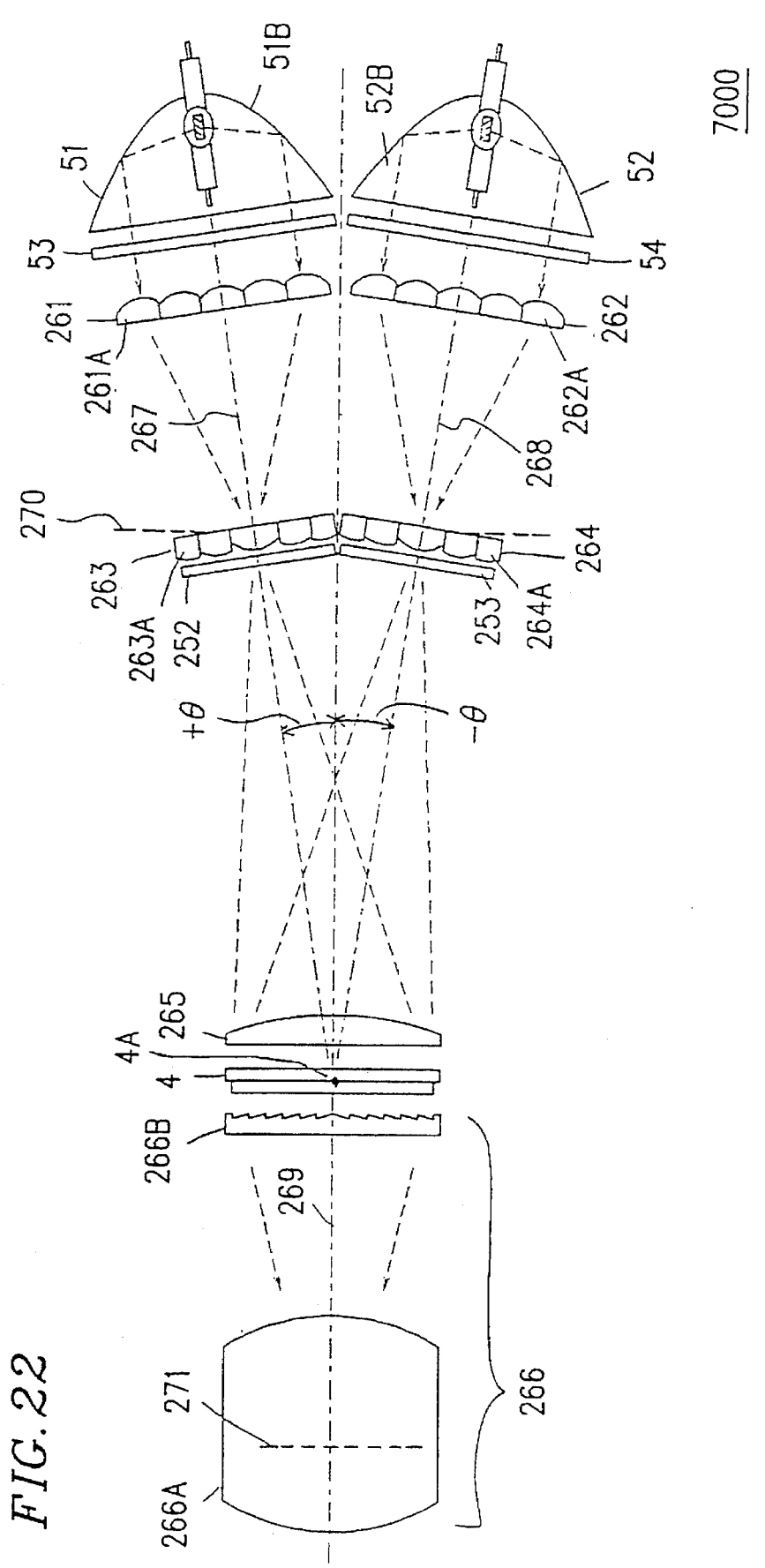
FIG. 22 is a schematic view of a projection display apparatus in a seventh example according to the present invention.

In FIG. 22, the light condensing optical systems 51 and 52, the UV-IR cutting filters 53 and 54, and the liquid crystal panel 4 are the same as those in the fourth example. First lens arrays 261 and 262, the second lens arrays 263 and 264, the third lens 265, and the projection lens 266 function in the same manner as the corresponding elements thereof in the fourth example. The projection lens 266 includes a main lens group 266A and a Fresnel lens 266B in the same manner as the corresponding examples in the sixth example.

The first lens array 261 includes a plurality of first lenses 261A arranged two dimensionally. The first lens array 262 includes a plurality of first lenses 262A arranged two dimensionally. The first lens arrays 261 and 262 each have, for example, the structure shown in FIG. 8. The second lens array 263 includes a plurality of second lenses 263A arranged two dimensionally. The second lens array 264 includes a plurality of second lenses 264A arranged two dimensionally. The second lens arrays 263 and 264 each have, for example, the structure shown in FIG. 11.

The first lenses 261A each converge the light beam incident thereon on a principal plane of the corresponding second lens 263A. Accordingly, actual images of the plurality of luminous elements are formed on a principal plane 263A of the second lens array 263. By forming the first lenses 261A of the first lens array 263 to be decentered in an appropriate direction and by an appropriate extent, actual images of the plurality of luminous elements can be arranged in a concentrated state as is shown in FIG. 11. The first lens array 262 is structured and functions in the same manner.

The plurality of second lenses 263A of the second lens array 263 form actual images of an object formed on the principal planes of the corresponding first lenses 261A onto the effective display area 4B of the liquid crystal panel 4. The second lenses 263A are formed appropriately decentered so that light beams passing therethrough are superimposed on the effective display area 4B of the liquid crystal panel 4. The magnification ratio of the second lenses 263A is determined so that light beams passing through the corresponding first lenses 261A will illuminate the entire effective display area 4B of the liquid crystal panel 4. The second lens array 264 is structured and functions in the same manner.

Optical axes of the first lens array 261 and the second lens array 263 are on an optical axis 267 of the light condensing optical system 51. Optical axes of the first lens array 262 and the second lens array 264 are on an optical axis 268 of the light condensing optical system 52. The optical axis of the first lens array 261 is in the normal direction which passes through a center of the aperture of the first lens array 261 as is shown in FIG. 8. The optical axis of each first lens 261A is parallel to the optical axis of the first lens array 261. The first lens array 262 and the second lens arrays 263 and 264 are structured in the same manner.

The optical axes 267 and 268 cross each other on the effective display area 4B of the liquid crystal panel 4 when extended. As in the sixth example, the optical axis 267 makes an angle $+\theta$ with an optical axis 269 of the projection lens 266. The optical axis 268 makes an angle $-\theta$ with the optical axis 269 of the projection lens 266. Signs + and − are used for convenience.

Due to the above-described structure, light beams outgoing from the plurality of light condensing optical systems can be transmitted to the liquid crystal panel 4 in a superimposed state without using the beam. composing lens 60 used in the fourth example. In the above-described example, the light condensing optical system 51, the UV-IR cutting filter 53, the first lens array 261, and the second lens array 263, which are arranged on the same, single optical axis, form one light source unit. The light condensing optical system 52, the UV-IR cutting filter 54, the first lens array 262, and the second lens array 264, which are arranged on the same, single optical axis, form one light source unit. By preparing a plurality of such light source units, a projection display apparatus for displaying a bright image can be structured very easily. Each light source unit including two lens arrays emits a light beam having highly uniform brightness and color. Since the light beams from two such light source units are superimposed on the liquid crystal panel 4, the image displayed by projection is satisfactorily bright and has highly uniform brightness and color.

As in the sixth example, the actual images of the plurality of luminous elements formed on the second lens arrays 263 and 264 can be regarded to be formed on one plane 270 for simplicity. In addition, mainly the third lens 265 and the Fresnel lens 266B allow the plane 270 and an entrance pupil 271 of the projection lens 266 to be conjugate with each other. Accordingly, the light beams from the actual images of the plurality of luminous elements formed on the plane 270 reach the entrance pupil 271 effectively.

In FIG. 22, two metal halide lamps are used. Any other number of lamps may be used. For example, in the case when four metal halide lamps are used, the actual images of the luminous elements are arranged to be inscribed in the circle 216 as is shown in FIG. 14. In such a case, the entrance pupil 271 has a radius corresponding to the radius of the circle 216.

In detail, the actual images of the plurality of luminous elements are formed on the second lens array in a concentrated state in a matrix to make the aperture of the second lens array as small as possible. The actual images from each second lens array are arranged in a matrix of 2×2. The elements of the projection display apparatus 7000 are arranged so that the angle θ in FIG. 22 will be of a minimum possible size. If necessary, the parabolic mirrors 51B and 52B are cut out to change the shape of the opening from which light is emitted in order to locate the light condensing optical systems 51 and 52 closer to each other.

The projection display apparatus 7000 may be provided with the color compensating filters 252 and 253 described in the sixth example on the optical paths of the light condensing optical systems 51 and 52. In this manner, the color reproduction properties of the illuminating light, and thus the quality of the image displayed on the screen by projection is enhanced.

Hereinafter, a projection display apparatus in a modification over the projection display apparatus 6000 in the sixth example will be described.

Figure 23:
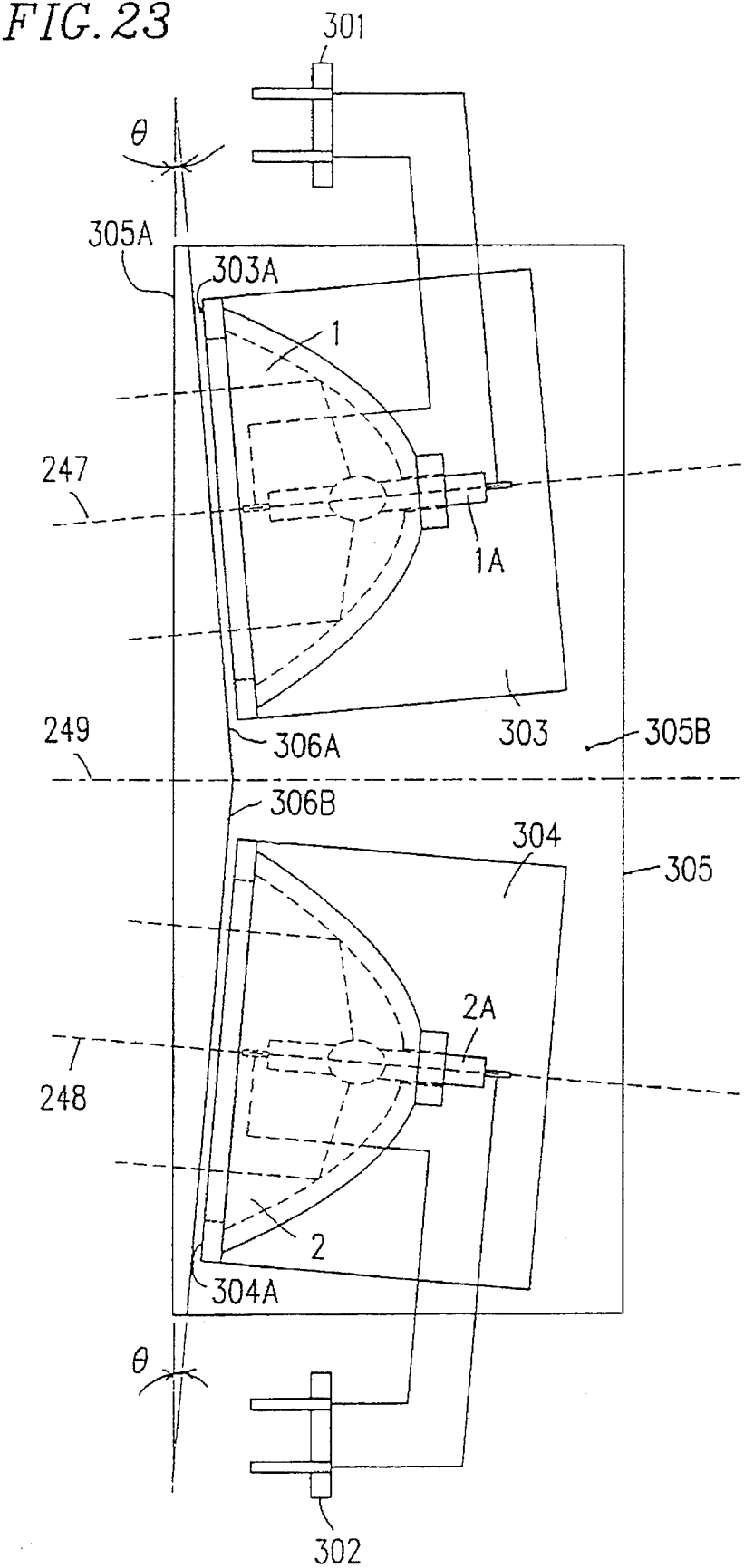
FIG. 23 is a schematic view of a lamp unit in the seventh example according to the present invention.

The light condensing optical systems 1 and 2 shown in FIG. 20 are preferably supported as is shown in FIG. 23. Reference numerals 301 and 302 are electrode sockets which are similar to the electrode sockets 152 and 153 as is shown in FIG. 15. The metal halide lamps 1A and 1B are supplied with electric power through the electrode sockets 301 and 302. L-shaped fixture 303 and 304 hold the light condensing optical systems 1 and 2, respectively. A supporting fixture 305 holds the fixtures 303 and 304. The one-dot chain line 249 denotes the optical axis of the projection lens (246) extended.

Figure 24:
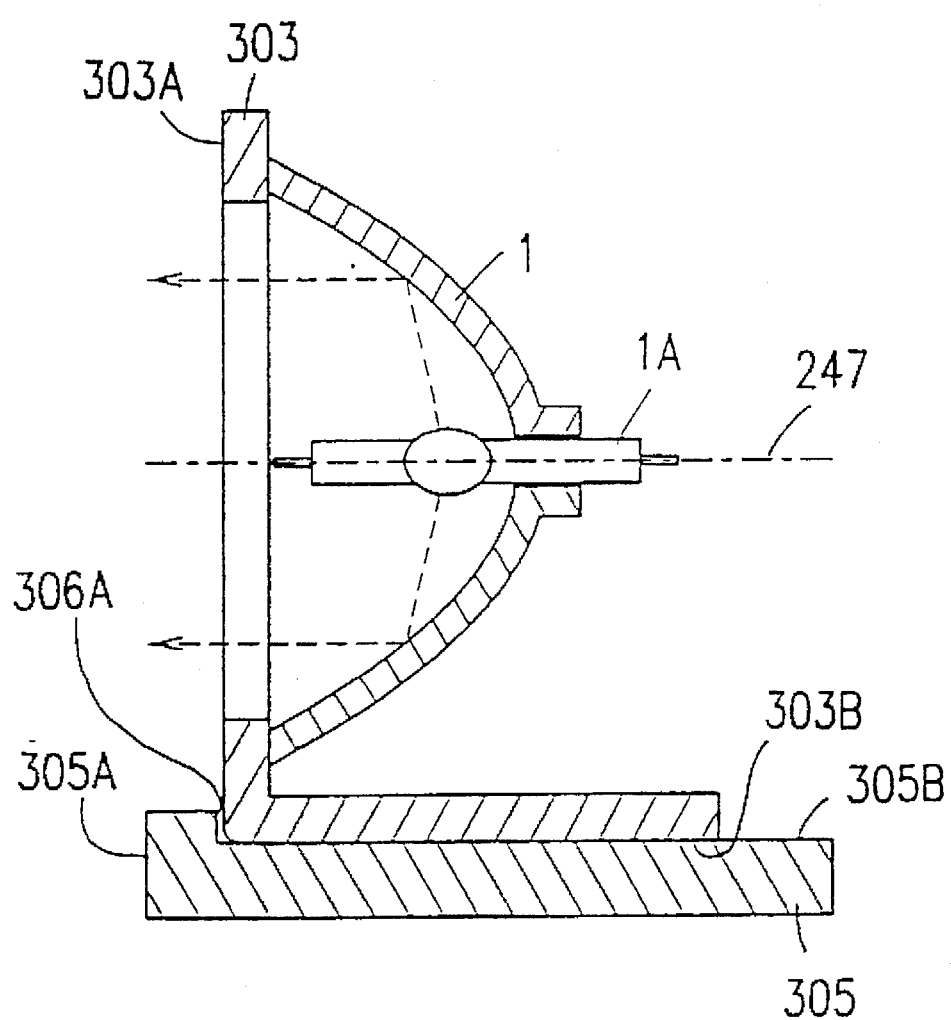
FIG. 24 is a cross sectional view of the lamp unit shown in FIG. 23.

FIG. 24 is a cross sectional view of the light condensing optical system 1 and the vicinity thereof taken along the optical axis 247 of the light condensing optical system 1. The supporting fixture 305 has a reference surface which is located appropriately with respect to the optical axis 249 of the projection lens 246. For example, a surface 305A is perpendicular to the optical axis 249, and a surface 305B is parallel to the optical axis 249. The supporting fixture 305 includes reference surfaces 306A and 306B (FIG. 23) for appropriately locating the light condensing optical systems 1 and 2. For example, the reference surface 306A is perpendicular to the optical axis 247, and the reference surface 306B is perpendicular to the optical axis 248. In other words, in the case when the projection display apparatus has the structure shown in FIG. 20, the reference surface 305A makes an angle of θ with the reference surfaces 306A and 306B.

The light condensing optical system i is fixed to the L-shaped fixture 303. A surface 303A of the L-shaped fixture 303 which is opposite to the surface thereof to which the light condensing optical system 1 is fixed is perpendicular to the optical axis 247. A surface 303B of the L-shaped fixture 303 is parallel to the optical axis 247. The surface 303A is aligned with the reference surface 306A, and thus the L-shaped fixture 303 is fixed to the supporting fixture 305 at a position where the optical axes 247 and 249 cross each other at a prescribed position. The light condensing optical system 2 and the L-shaped fixture 304 have the same relationship.

In the sixth example, if the optical axis 247 or 248 is extended to reach a position on the effective display area 4B of the liquid crystal panel 4 which is far from the center 4A, the brightness of the image formed by projection is not uniform. The supporting fixture 305 has a reference surface with respect to the optical axis 249 of the projection lens. The plurality of light condensing optical systems can be fixed with high precision using the reference surface.

By fixing the light condensing optical systems as is described above, the light beams outgoing from the plurality of light condensing optical systems can be superimposed on the liquid crystal panel with high precision. By preparing a plurality of light condensing optical systems in the state of being fixed to another supporting fixture in advance, a plurality of lamps can be replaced easily by simply replacing the supporting fixtures.

Figure 25:
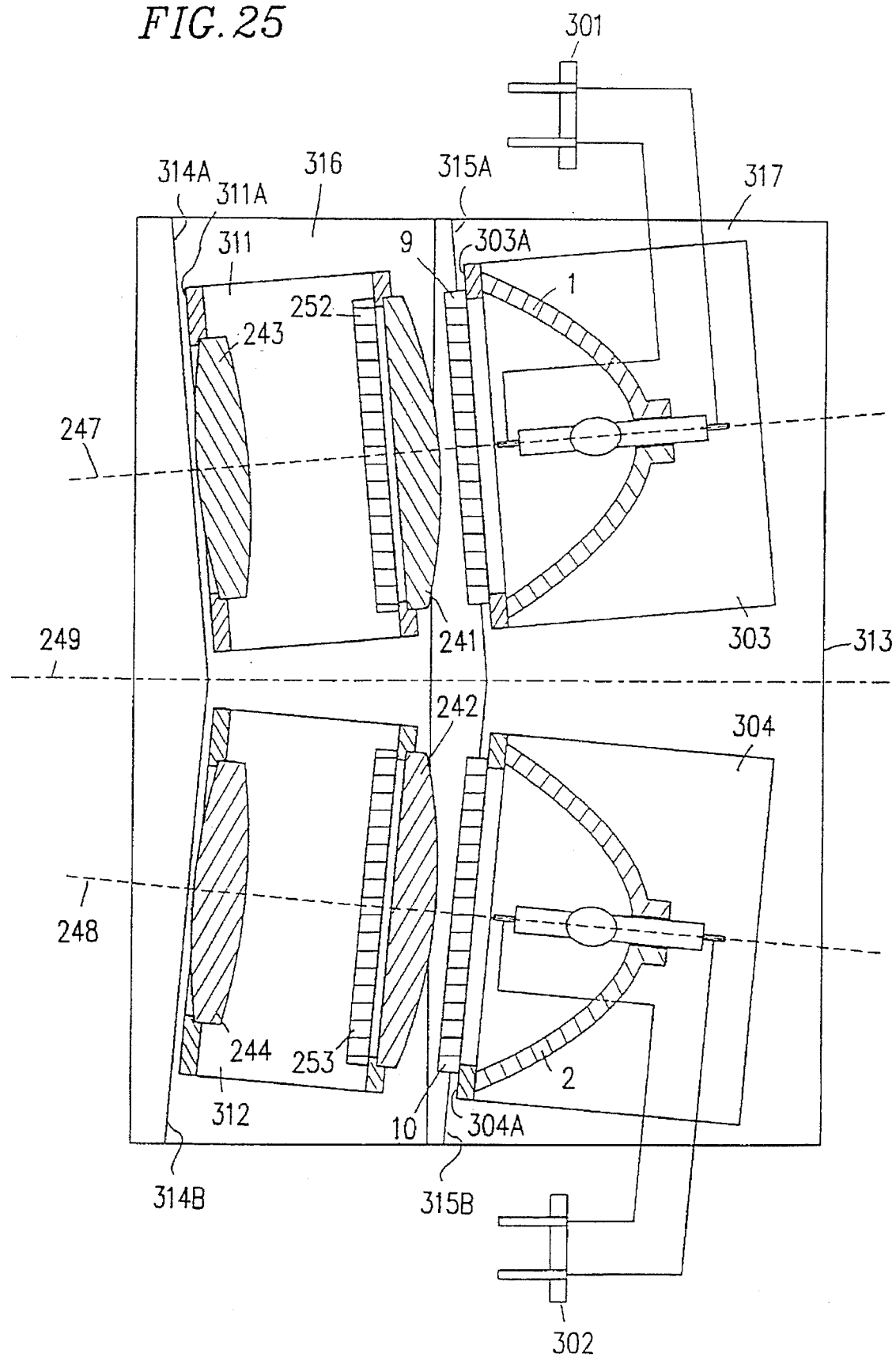
FIG. 25 is a schematic cross sectional view of a lamp unit and a lens unit in the seventh example according to the present invention.

FIG. 25 illustrates another preferable modification of the projection display apparatus 6000. FIG. 25 is a cross sectional view of a corresponding part of the projection display apparatus shown in FIG. 23 taken along a plane including the optical axes 247 and 248. One-dot chain line 249 denotes the optical axis of the projection lens (246) extended.

In FIG. 25, the light condensing optical systems 1 and 2 are fixed and held by the L-shaped fixtures 303 and 304, respectively. The UV-IR cutting filters 9 and 10 are attached and held to the surfaces 303A and 304A of the L-shaped fixtures 303 and 304 on the side from which the light beams are outgoing. The electrode sockets 301 and 302 are the same as those in FIG. 23. Hereinafter, the L-shaped fixture 303 including the light condensing optical system 1 and the UV-IR cutting filter 9 will be referred to as a lamp unit 303. The L-shaped fixture 304 including the light condensing optical system 2 and the UV-IR cutting filter 10 will be referred to as a lamp unit 304.

The first lens 241, the second lens 243 and the color compensating filter 252 are fixed to a U-shaped fixture 311 and held integrally. Hereinafter, such an integral body will be referred to as a lens unit 311. The first lens 242, the second lens 244 and the color compensating filter 253 are fixed to a U-shaped fixture 312 and held integrally. Hereinafter, such an integral body will be referred to as a lens unit 312.

Figure 26:
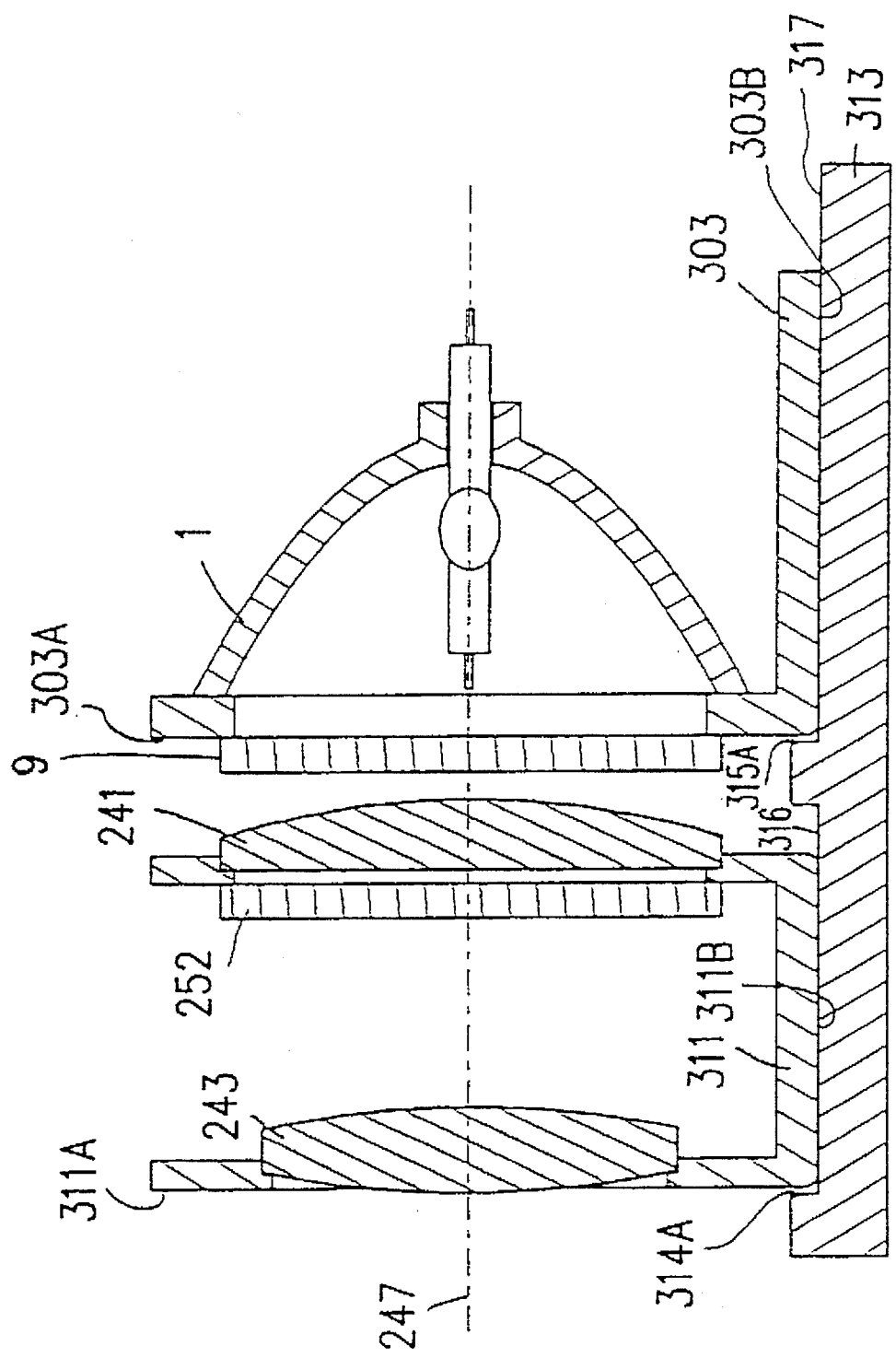
FIG. 26 is a schematic cross sectional view of the lamp unit and the lens unit in the seventh example according to the present invention.

FIG. 26 is a cross sectional view of the light condensing optical system 1 and the vicinity thereof taken along the optical axis 247 shown in FIG. 25. The light condensing optical system 1 and the vicinity thereof will be described hereinafter. The light condensing optical system 2 has the same structure.

The lamp unit 303 and the lens unit 311 are attached to a supporting fixture 313 having the same structure as the supporting fixture 305. The supporting fixture 313 has reference surface 314A, 314B, 315A and 315B. The reference surfaces 314A and 315A are perpendicular to the optical axis 247. In the case when the lamp unit 303 and the lens unit 311 are fixed based on the reference surfaces 314A and 315A, the elements of the projection display apparatus 6000 maintain prescribed distances from one another, and the optical axes 247 and 249 cross each other in the center 4A of the effective display area 4B of the liquid crystal panel 4 and the vicinity thereof. The reference surfaces 314B and 315B function in the same manner.

In detail, the reference surface 303A of the lamp unit 303 is aligned to the reference surface 315A, and the reference surface 311A of the lamp unit 311 is aligned to the reference surface 314A. A bottom surface 303B of the lamp unit 303 and a bottom surface 311B of the lens unit 311 are parallel to the optical axis 247, and the supporting fixture 313 has reference surfaces 316 and 317 to be aligned therewith. The lamp unit 304 and the lens unit 312 function in the same manner.

By provision of the above-described reference surfaces, the lamp units 303 and 304 and the lens units 311 and 312 can be fixed at prescribed positions with high precision. Since the complicated elements of the projection display apparatus are treated as units, the elements are easily assembled. Further, since the optical axes 247 and 248 of the light condensing optical systems 1 and 2 can cross each other satisfactorily in the center 4A of the effective display area 4B of the liquid crystal panel 4 and the vicinity thereof, the light beams outgoing from the light condensing optical systems 1 and 2 can be satisfactorily superimposed, thus to display a high quality image with substantially uniform brightness by projection.

The structure shown in FIG. 25 may be used in the projection display apparatus 7000 in the seventh example shown in FIG. 22. In such a case, the first lens arrays 261 and 262 are fixed instead of the first lenses 241 and 242. The second lens arrays 263 and 264 are fixed instead of the second lenses 243 and 244. The same effects can be obtained.

In FIG. 25, the light condensing optical system and the UV-IR cutting filter are integrally held, and the first lens, the second lens and the color compensating filter are integrally held. The present invention is not limited to such a combination. The same effects are obtained with other combinations.

Alternatively, the light condensing optical system, the UV-IR cutting filter, the first lens (or the first lens array), the second lens (or the second lens array), and the color compensating filter may be all integrally held to form a light source unit. The UV-IR cutting filter and the color compensating filter may be eliminated. In such a case, by fixing a plurality of light source units to prescribed positions of the supporting fixtures having reference surfaces, the projection display apparatus in the sixth or the seventh example can be realized easily.

In the sixth and the seventh examples, the plurality of light source units all have the same structure. An inexpensive projection display apparatus which is easy to assemble due to a small number of components can be realized by simply providing a plurality of light source units having the same structure. Moreover, since a bright image can be easily displayed by projection, a high light utilization efficiency is obtained.

EXAMPLE 8

Figure 27:
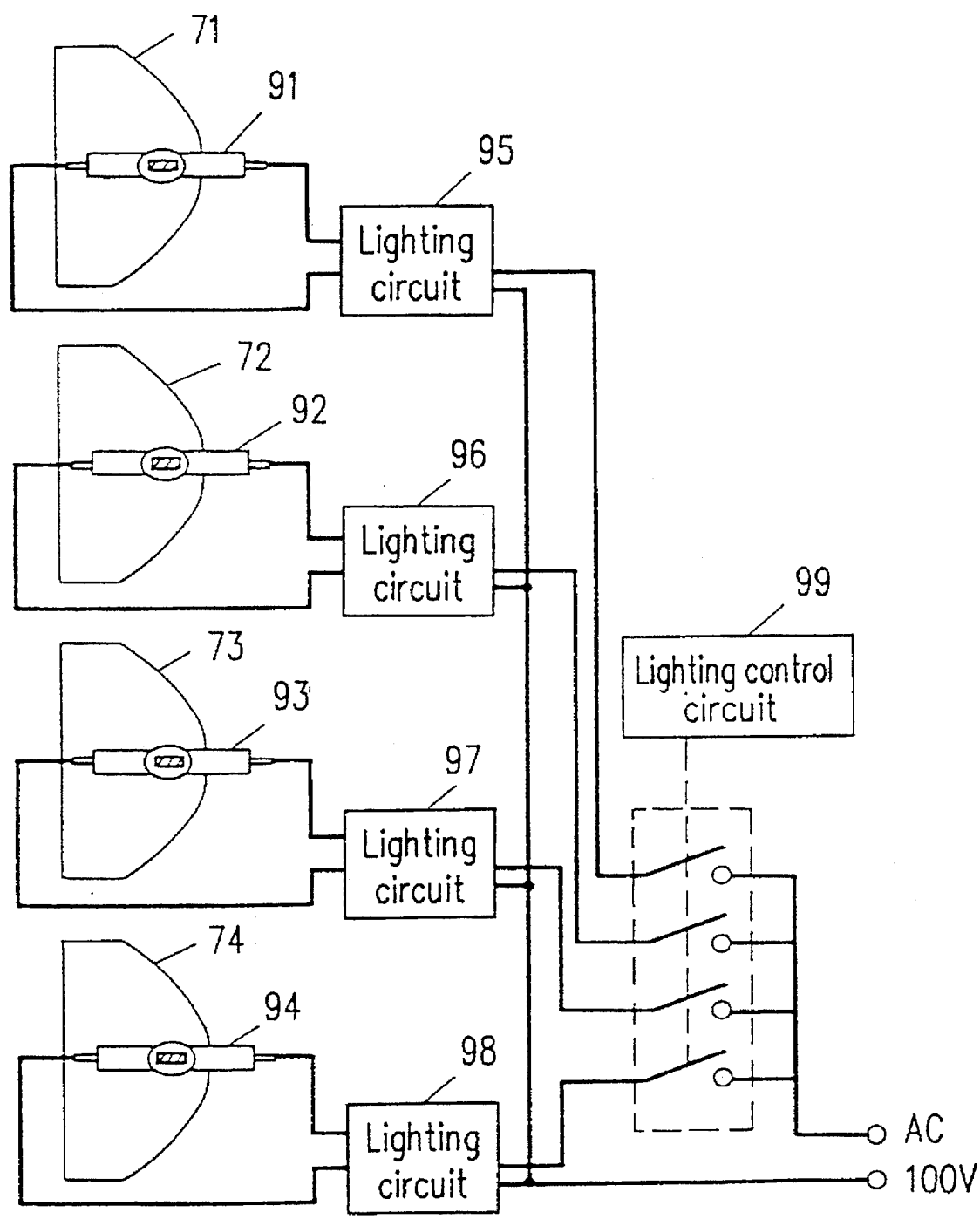
FIG. 27 is a schematic circuit diagram for lighting up a plurality of metal halide lamps in a projection display apparatus in an eighth example according to the present invention.

A projection display apparatus 8000 in an eighth example according to the present invention will be described with reference to FIG. 27. The structure of the projection display apparatus 8000 may be used in the projection display apparatuses in all the previous examples. For instance, in the following description, a projection display apparatus as shown in FIG. 7 using four light condensing optical systems 71, 72, 73 and 74 shown in FIG. 12 is configured. FIG. 27 illustrates a system for lighting up a plurality of lamps.

In FIG. 27, the light condensing optical systems 71 through 74 are arranged in a straight line on one plane for simplicity. The light condensing optical systems respectively include metal halide lamps 91, 92, 93 and 94 each having a luminous element for emitting light. The metal halide lamps 91, 92, 93 and 94 are respectively connected to lighting circuits 95, 96, 97 and 98. A lighting control circuit 99 controls the level of the power to be supplied to each of the lighting circuits 95, 96, 97 and 98. In detail, the lighting control circuit 99 can light up four lamps 91 through 94 selectively. One lamp, two lamps, three lamps or four lamps can be lit up by the lighting control circuit 99.

In the case that a projection display apparatus includes a plurality of lamps, the brightness of the image displayed by projection can be changed step by step by controlling the ON/OFF state of each lamp. Thus, the brightness of the image can be adjusted easily.

In general, the luminous output can be controlled by changing the power to be supplied to one lamp. However, such a system poses a problem in that the lamp characteristics also change. Especially, since the emission spectrum of a metal halide lamp changes in accordance with the electric power supplied thereto, such a system poses a serious problem. However, if the brightness of light is adjusted using the above-described system shown in FIG. 27, the power which is supplied to each lamp is constant. Accordingly, the brightness of light can be adjusted easily without changing the characteristics of the lamps.

In a projection display apparatus according to the present invention, light emitted by a plurality of lamps are transmitted to the liquid crystal panel as light beams in a superimposed state. Due to such a structure, even if only some of the plurality of lamps are selectively lit up, significant non-uniformity in brightness does not occur. Because of such an advantage, the brightness of the entire image displayed on the screen by projection can be adjusted uniformly by controlling the number of lamps to be lit up by the above-described system. In such a projection display apparatus, the luminous output can be changed easily in accordance with the environments of image projection and the size of the screen. Such a projection display apparatus is easy to use and has a high light utilization efficiency.

Figure 28:
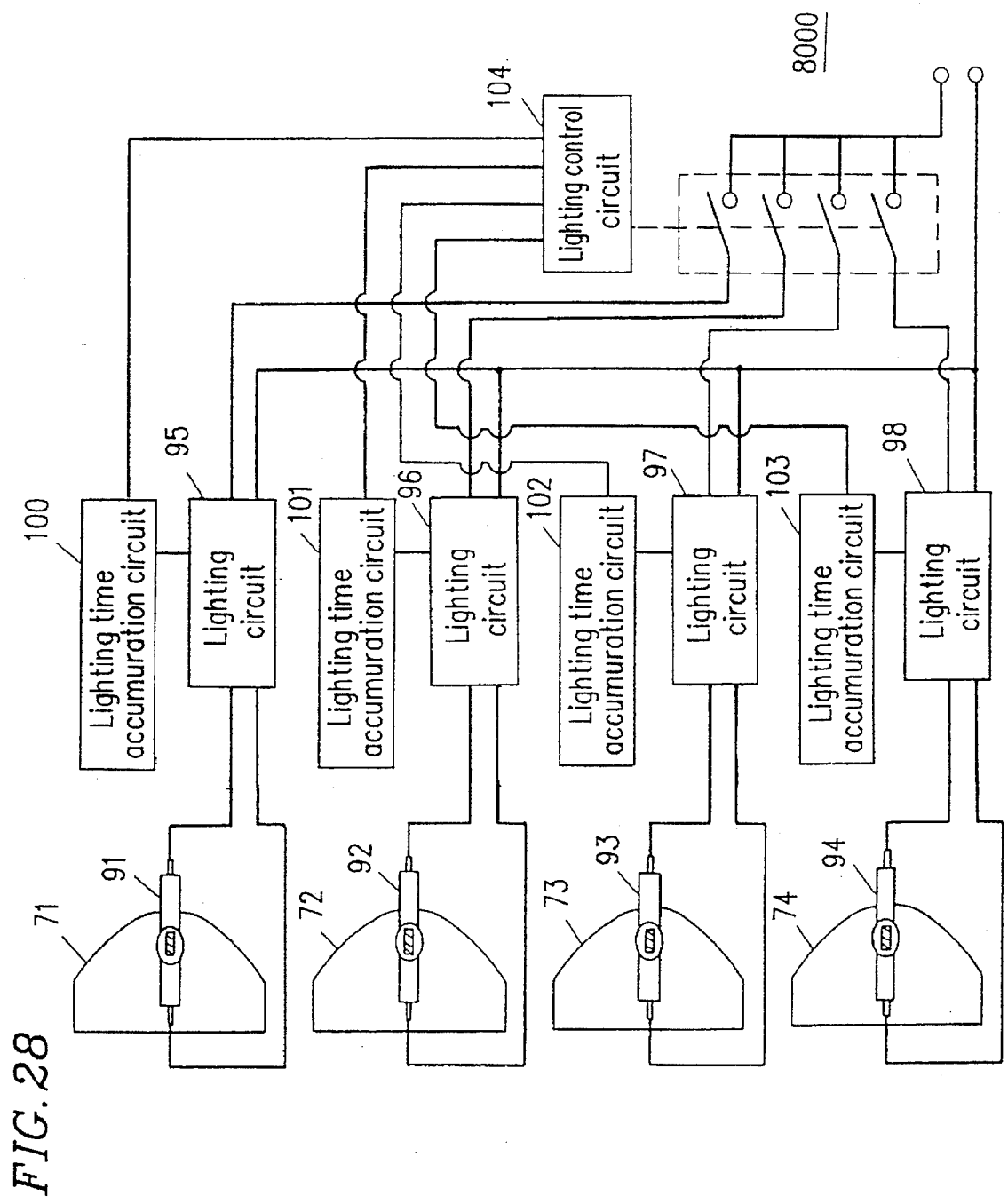
FIG. 28 is a schematic circuit diagram for lighting up a plurality of metal halide lamps in a projection display apparatus in a modification of the eighth example according to the present invention.

FIG. 28 shows a modification over the projection display apparatus 8000 illustrated in FIG. 27.

In FIG. 28, the light condensing optical systems 71 through 74, the metal halide lamps 91 through 94, and the lighting circuits 95 through 98 are the same as those in FIG. 27. The lighting circuits 95, 96, 97 and 98 are respectively connected to lighting time accumulation circuits 100, 101, 102 and 103. The lighting time accumulation circuits 100 through 103 accumulate how long the corresponding lamps have been lit up since they were new and output the result to the lighting control circuit 104.

The lighting control circuit 104 lights up the lamps selectively in the same manner as the lighting control circuit 99 in FIG. 27, except that, in lighting up three or less lamps selectively, the lighting control circuit 104 refers to the data obtained by the lighting time accumulation circuits 100 through 103 and thus selects the lamp or lamps to be lit up. For example, in selecting one lamp to be lit up, one of the four lamps which has been lit up for the shortest period is selected. In lighting up two lamps, two lamps which have been lit up for the shortest periods are selected. In lighting up three lamps, three of the four lamps except for the one which has been lit up for the longest period are selected.

By lighting up the lamps as is described above, the four lamps can be used uniformly. In other words, the four lamps can be used for the life thereof at the same pace so that the life thereof is terminated at substantially the same time. Thus, four lamps can be replaced simultaneously. As a result, a projection display apparatus which is easy to use with less trouble of lamp replacement is obtained.

In the eighth example, four lamps are used. Any other number of lamps may be used, and halogen lamps or xenon lamps may be used.

In each of the projection display apparatuses in the first through eighth examples, one liquid crystal panel is used as a light valve. In such a case, by combining a color filter having red, green and blue areas in a mosaic state with pixels, a full-color image can be displayed by projection.

EXAMPLE 9

In a ninth example, a projection display apparatus 9000 for displaying a full-color image may be structured using three liquid crystal panels respectively for forming red, green and blue optical images. This will be described with reference to FIG. 29.

Figure 29:
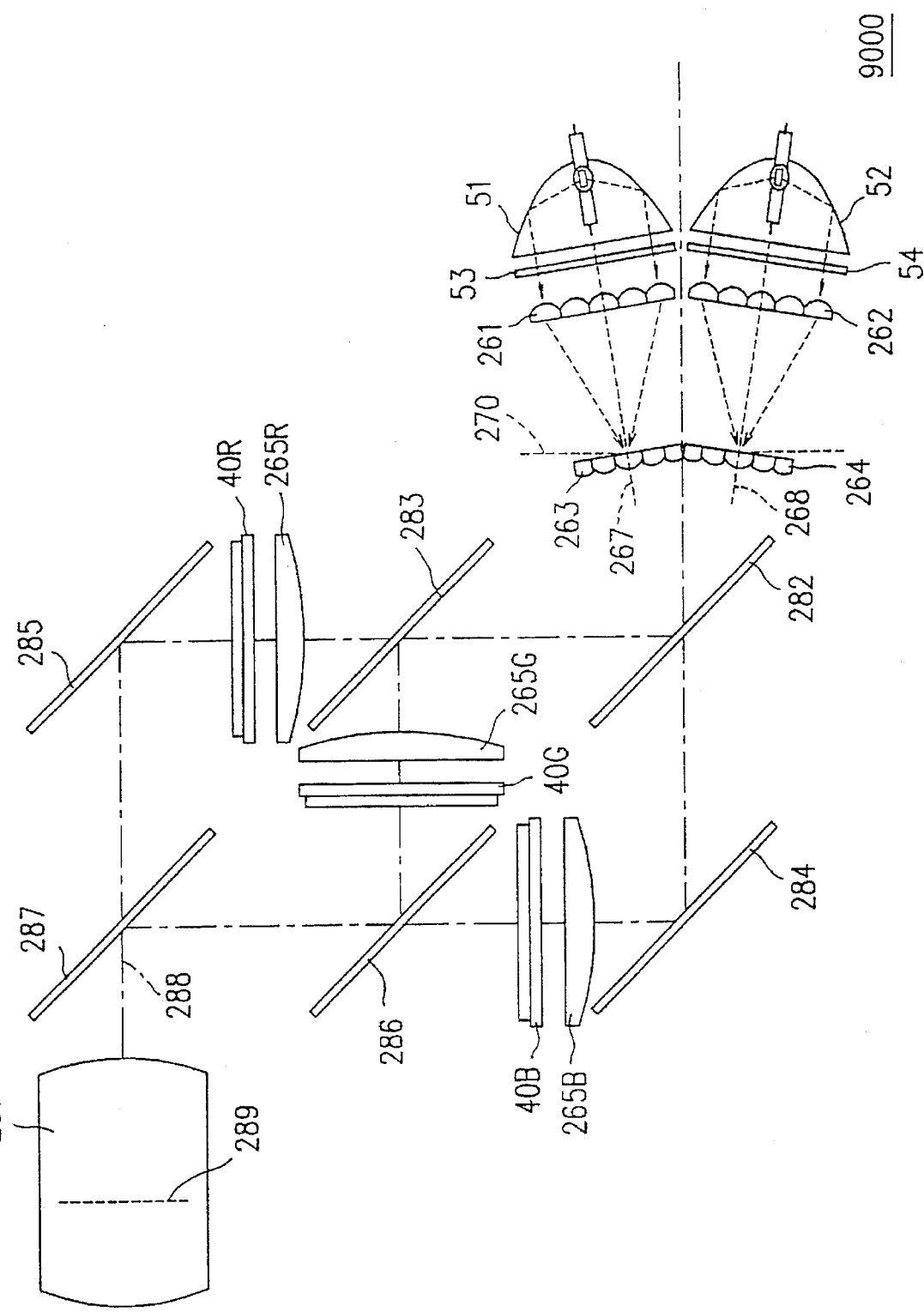
FIG. 29 is a schematic view of a projection display apparatus in a ninth example according to the present invention.
Figure 30:
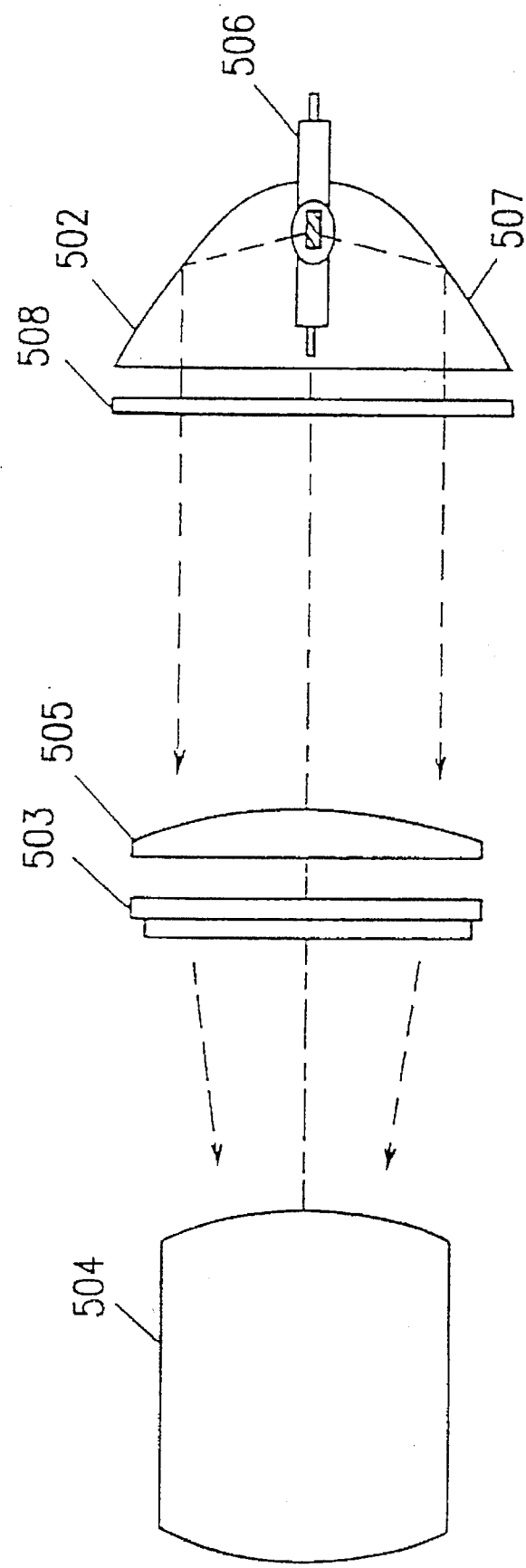
FIG. 30 is a schematic view of a conventional projection display apparatus.

In FIG. 29, the light condensing optical systems 51 and 52, the UV-IR cutting filters 53 and 54, the first lens arrays 261 and 262, and the second lens arrays 263 and 264 are the same as those in the seventh example FIG. 22. A liquid crystal panel 40R forms an optical image corresponding to red video signals, a liquid crystal panel 40G forms an optical image corresponding to green video signals, and a liquid crystal panel 40B forms an optical image corresponding to blue video signals. Lenses 265R, 265G and 265B corresponding to the third lens 265 in FIG. 22 are provided upstream with respect to the liquid crystal panels 40R, 40G and 40B respectively in the direction in which the light is transmitted.

A dichroic mirror 282 allows blue light to transmit therethrough and reflects red light and green light. A dichroic mirror 283 allows red light to transmit therethrough and reflects green light. A flat mirror 284 transmits blue light incident thereon to the liquid crystal panel 40B. Thus, light beams emitted from the second lens arrays 263 and 264 are divided into three light components of the RGB colors and are transmitted to the liquid crystal panels 40R, 40G add 40B of the respective colors.

A dichroic mirror 286 allows blue light to transmit therethrough and reflects green light. A dichroic mirror 287 allows red light to transmit therethrough and reflects green light and blue light. A flat mirror 285 reflects the light emitted from the liquid crystal panel 40R. Thus, the optical paths of the light emitted from the liquid crystal panel 40R, the light emitted from the liquid crystal panel 40G, and the light emitted from the liquid crystal panel 40B are composed. The optical images of each of the RGB colors are composed to form a full-color optical image, and a full-color video image is projected on the screen by a projection lens 281.

The optical axes 267 and 268 of the light condensing optical systems 51 and 52 cross an optical axis 288 of the projection lens 281 in a center of an effective display area of each of the liquid crystal panels 40R, 40G and 40B and the vicinity thereof. Actual images of a plurality of luminous elements formed on the second lens arrays 263 and 264 can be regarded to be formed on a plane 270 for simplicity. The optical elements on the optical path from the plane 270 to an entrance pupil 289 of the projection lens 281 allow the plane 270 and the entrance pupil 289 to be substantially conjugate with each other.

In the above-described structure, the light beams outgoing from the light condensing optical systems 51 and 52 each have excellently uniform brightness because of the function of the two lens arrays and illuminate the effective display area of the liquid crystal panels 40R, 40G and 40B. The light emitted by the lamps is condensed efficiently and reaches the entrance pupil 289 of the projection lens 281 through the liquid crystal panels 40R, 40G and 40B. Accordingly, a projection display apparatus having a high light utilization efficiency can be realized. Further, since the light beams outgoing from the plurality of light condensing optical systems are superimposed on the liquid crystal panel, significant non-uniformity in brightness does not occur. Accordingly, a projection display apparatus having a large luminous output easily, and a high light utilization efficiency is achieved.

In all the previous examples, a liquid crystal panel is used as a light valve. Any other light valve, for example, a reflective light valve may be used. The same effects can be obtained as far as the light is modulated spatially to form an optical image.

A projection display apparatus according to the present invention is not limited to the above-described structure, but may have any other structure which provides the above-described effects. Each of the elements of the projection display apparatus need not fulfill the above-mentioned specifications but may be structured to substantially achieve the above-described effects.

According to the present invention, a light source can be provided using, for example, two lamps each having a power consumption of 250 W, for generating an luminous output having an intensity which is equal to or higher than the luminous output obtained by one lamp having a power consumption of 500 W. If four lamps each having a power consumption of 250 W are used, a light for generating an luminous output having an intensity which is equal to or higher than the luminous output obtained by one lamp having a power consumption of 1 kW can be provided.

Generally, a lamp having a large power consumption has a long length and thus is not suitable for structuring a compact light source. By contrast, a lamp having a small power consumption is suitable for a compact light source. By using a plurality of lamps having a small power consumption, a compact light source can be provided, and thus a compact projection display apparatus can be realized.

By developing a lamp having a power consumption of 250 W having prescribed light emitting characteristics as a multiple-purpose lamp, a light source for generating an luminous output corresponding to 500 W or 1 kW can be easily provided using a plurality of such multiple-purpose lamps with lost cost. Accordingly, a projection display apparatus having a large luminous output can be structured with low cost.

A lamp having a small power consumption has a relatively small luminous element and a shape which is proximate to a spherical shape. Accordingly, light emitted by each of a plurality of luminous elements of such lamps can be condensed and transmitted to the liquid crystal panel acting as a light valve efficiently. The light beams can then reach the projection lens effectively. As a result, a projection display apparatus having a high light utilization efficiency can be provided.

A projection display apparatus according to the present invention includes a light transmitting optical system which is suitable for the plurality of light sources described above. The light transmitting optical system allows the light beams from each light source to transmit to the display area of the liquid crystal panel efficiently and illuminates the liquid crystal panel with the light beams in a superimposed state. Thus, a bright and high quality image can be displayed by projection substantially with no influence of the non-uniformity in brightness and color reproduction properties among different light source.

The light transmitting optical system of the projection display apparatus according to the present invention is arranged so that actual images of a plurality of luminous elements are formed in the optical path thereof and the actual images are inscribed in a circle on one plane. The optical elements existing on the optical path between the actual images of the luminous elements and the entrance pupil conjugate the plane on which the actual images are formed and the entrance pupil with each other. Due to such a structure, the apparent expansion of the actual images of the plurality of luminous elements observed from the light receiving side can be restricted, and light emitted by the plurality of luminous elements can reach the screen efficiently even if the aperture diameter of the projection lens is relatively short.

A projection display apparatus for displaying a higher quality image can be structured using a light transmitting optical system including a pair of lens arrays corresponding to each of the plurality of light sources. A light beam from each of the plurality of light sources is incident on the first lens array and divided into a plurality of light components having less non-uniform brightness. The second lens array enlarges and transmits the light components to the display area of the light valve in a superimposed state. Accordingly, an image having a high uniformity in brightness can be displayed by the light beams from each of the light sources. Further, since the light beams from the light sources reach the display area in a superimposed state, the light valve can be illuminated by light which is bright and uniform in brightness. As a result, a bright and high quality image can be displayed by projection.

By arranging the light sources so that the optical axes thereof are tilted with respect to the normal direction of the effective display area of the light valve, the light beams from the light sources can be superimposed on the effective display area easily and effectively without adding any other optical element. In order to easily realize such an arrangement, a plurality of light source units each including a lamp, a light condensing optical system and a part of the lenses included in the light transmitting optical system are prepared. The lamp, the light condensing optical system and the part of the lenses are held integrally. By attaching the plurality of light source units at a prescribed position in a prescribed direction, light beams from the light sources can be superimposed on the effective display area easily. The light source units can have the same structure including the same components regardless of the position thereof. Since the same components can be used for all the light source units, the projection display apparatus is easy to assemble and less costly.

In such a structure, a frame having a reference plane is preferably prepared. By fixing the optical elements forming the light sources to the frame in a prescribed direction at a prescribed angle, the plurality of light sources can be fixed easily at a prescribed position with respect to the light valve.

By controlling the plurality of light sources to be lit up individually, the brightness of the image displayed by projection can be adjusted easily by steps. For example, in a projection display apparatus having four lamps, the brightness can be adjusted to four levels by controlling the number of lamps to be lit up. By providing a circuit for accumulating the time period for which each lighting source has been lit up from the initial state, the lamps can be lit for approximately the same period of time. When some of the lamps are to be selected to be lit up, the lamps having shorter lighting time are lit up with priority.

According to the above-described structure, light emitted by the plurality of lamps can be condensed efficiently and transmitted to illuminate the effective display area as light beams in a superimposed state with little loss. Further, the light outgoing from the light valve is mostly incident on the projection lens and reaches the screen. Accordingly, a projection display apparatus having a large luminous output can be structured easily. Since the light sources are compact and inexpensive although providing a large luminous output, the projection display apparatus is also compact and inexpensive.

Since the brightness of the image displayed by projection can be adjusted by steps, the projection display apparatus is easy to use. Since the lamps having shorter lighting time are lit up with priority, the plurality of lamps can be lit for approximately the same period of time. Since the plurality of lamps can be replaced in a single operation step, the replacement of the lamps is easy.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A projection display apparatus for displaying an image on a screen by projection, comprising:

a light valve for forming an optical image by spatially modulating light;

a light source for forming light for illuminating the optical image; and a projection lens for projecting the optical image on the screen, wherein:

the light source includes:

at least two luminous elements each for emitting light, a plurality of light condensing devices provided in the same number as the luminous elements to respectively correspond to the luminous elements, each of the light condensing devices condensing light emitted by the corresponding luminous element to form a light beam transmitting in substantially a single direction, and a light transmitting device for transmitting the light beams outgoing from the corresponding light condensing devices to the light valve so as to superimpose the light beams on the optical image, the light transmitting device forming actual images of the luminous elements on an optical path, the number of the actual images being N times the number of the luminous elements where N is an integer of at least one, the actual images being substantially inscribed in a circle on a plane, and lenses on the optical path between the plane and an entrance pupil of the projection lens allowing the plane and the entrance pupil to be substantially conjugate with each other.

2. A projection display apparatus according to claim 1, wherein the light transmitting device includes:

first lenses provided in the same number as the light condensing devices to respectively correspond to the light condensing devices;

second lenses provided in the same number as the first lenses to respectively correspond to the first lenses; and a third lens located in the vicinity of a surface of the light valve on which light is incident, and wherein:

the first lenses each converge the light beam outgoing from the corresponding light condensing device on a principal plane of the corresponding second lens and the vicinity thereof to form an actual image of the corresponding luminous element, the second lenses each form an actual image of an object formed on a principal plane of the corresponding first lens and the vicinity thereof onto a principal plane of the third lens and the vicinity thereof so as to superimpose the actual images, and the third lens allows the light beam incident thereon to reach the projection lens effectively.

3. A projection display apparatus according to claim 2, wherein the plurality of first lenses are each appropriately decentered so as to arrange the plurality of actual images of the plurality of luminous elements formed by the first lenses to be inscribed in a circle having a minimum possible radius.

4. A projection display apparatus according to claim 2, wherein the plurality of second lenses are each appropriately decentered so as to allow a light beam passing through a center of an aperture of the corresponding first lens to reach a position in a center of an effective display area of the light valve and the vicinity thereof.

5. A projection display apparatus according to claim 1, wherein the light transmitting device includes:

first lens arrays provided in the same number as the light condensing devices to respectively correspond to the light condensing devices;

second lens arrays provided in the same number as the first lens arrays to respectively correspond to the first lens arrays; and a third lens located in the vicinity of a surface of the light valve on which light is incident, and wherein:

the first lens arrays each include a plurality of first lenses arranged two dimensionally, the second lens arrays each include a plurality of second lenses arranged two dimensionally and provided in the same number as the first lenses to respectively correspond to the first lenses, the first lenses each converge the light beam which is incident thereon after outgoing from the corresponding light condensing device onto a principal plane of the corresponding second lens and the vicinity thereof to form an actual image of the corresponding luminous element, the second lenses each form an actual image of an object formed on a principal plane of the corresponding first lens and the vicinity thereof onto a principal plane of the third lens and the vicinity thereof so as to superimpose the actual images, and the third lens allows the light beam incident thereon to reach the projection lens effectively.

6. A projection display apparatus according to claim 5, wherein the plurality of second lenses have apertures having appropriately different sizes and shapes from each other, each of the apertures being sufficiently large with respect to the actual image of the corresponding luminous element; and an effective aperture of each of the second lens arrays has a minimum possible area.

7. A projection display apparatus according to claim 5, wherein the plurality of first lenses are each appropriately decentered so as to locate an actual image of the luminous element formed by the first lens in a center of an aperture of the corresponding second lens and the vicinity thereof.

8. A projection display apparatus according to claim 5, wherein the plurality of second lenses are each appropriately decentered so as to allow a light beam passing through a center of an aperture of the corresponding first lens to reach a position in a center of an effective display area of the light valve and the vicinity thereof.

9. A projection display apparatus according to claim 1, wherein the projection lens includes a converging lens having a positive power in the vicinity of a surface of the light valve from which light is outgoing, and at least one of optical surfaces of the converging lens has a shape which is proximate to an aspherical shape.

10. A projection display apparatus according to claim 9, wherein the optical surface of the converging lens on the surface of the light valve from which the light is outgoing is a Fresnel lens having a shape which is proximate to an aspherical shape.

11. A projection display apparatus according to claim 1, wherein the light transmitting device has an optical surface having a property for scattering light on a plane on which actual images of the plurality of luminous elements are formed and the vicinity thereof.

12. A projection display apparatus according to claim 1, wherein at least one of optical surfaces of lenses included in the light transmitting device has a shape which is proximate to an aspherical shape.

13. A projection display apparatus according to claim 1, wherein the light source includes lamps acting as luminous elements which are provided in one of the numbers of two, four, six and nine.

14. A projection display apparatus according to claim 1, wherein the plurality of luminous elements are each a lamp, and the plurality of lamps are supported by a single supporting structure so as to be replaceable by a single operation step of replacing the supporting structure.

15. A projection display apparatus according to claim 1, wherein the light condensing devices each include a concave mirror, and the concave mirror has a reflective surface which is proximate to one of a parabolic surface and an ellipsoid surface.

16. A projection display apparatus according to claim 1, wherein the light valve includes a twisted nematic type liquid crystal panel including a pixel electrode.

17. A projection display apparatus according to claim 1, wherein the luminous elements are each a metal halide lamp.

18. A projection display apparatus according to claim 17, further comprising:

lamp voltage supply devices provided in the same number as the metal halide lamps to respectively correspond to the metal halide lamps; and a high-voltage pulse generating device which is shared by at least two metal halide lamps, and wherein:

the lamp voltage supply devices each supply a lamp voltage to the corresponding metal halide lamp for normal operation to form the luminous element, and the high-voltage pulse generating device is selectively interposed between one of the lamp voltage supply devices and the corresponding metal halide lamp to generate a high-voltage pulse which is necessary to start up the metal halide lamp.

19. A projection display apparatus according to claim 17, wherein the metal halide lamps each include at least one of dysprosium and neodymium.

20. A projection display apparatus according to claim 17, wherein the metal halide lamps each include at least one of gadolinium and lutetium.

21. A projection display apparatus for displaying an image on a screen by projection, comprising:

a light valve for forming an optical image by spatially modulating light;

a light source for forming light for illuminating the optical image; and a projection lens for projecting the optical image on the screen, wherein:

the light source includes:

at least two luminous elements each for emitting light, a plurality of light condensing devices provided in the same number as the luminous elements to respectively correspond to the luminous elements, each of the light condensing devices condensing light emitted by the corresponding luminous element to form a light beam, wherein optical axes of the plurality of light condensing optical devices are tilted with respect to the normal direction to an effective display area of the light valve and cross each other at a position in a center of the effective display area and the vicinity thereof.

22. A projection display apparatus according to claim 21, further comprising a filter for removing one of infrared rays and ultraviolet rays on an optical axis of each of the plurality of light condensing devices.

23. A projection display apparatus according to claim 21, further comprising a filter for removing light of a part of the range of wavelengths of visible light on an optical axis of each of the plurality of light condensing devices.

24. A projection display apparatus according to claim 21, further comprising:

a plurality of lamp units respectively including the luminous elements and the corresponding light condensing devices which are held integrally, each luminous element being a lamp; and a frame including a reference plane which is at one of a parallel position and a perpendicular position with respect to the normal direction to the light valve, wherein the lamp units are each arranged so as to be tilted in a prescribed direction at a prescribed angle with respect to the frame.

25. A projection display apparatus according to claim 21, further comprising:

a light transmitting device for superimposing the light beams outgoing from the plurality of light condensing devices on the optical image formed on the light valve, the light transmitting device including:

first lenses provided in the same number as the light condensing devices to respectively correspond to the light condensing devices;

second lenses provided in the same number as the first lenses to respectively correspond to the first lenses; and a third lens located in the vicinity of a surface of the light valve on which light is incident, and wherein:

the first lenses each converge the light beam incident thereon onto a principal plane of the corresponding second lens and the vicinity thereof, the second lenses each form an actual image of an object formed on a principal plane of the corresponding first lens and the vicinity thereof onto a principal plane of the third lens and the vicinity thereof so as to superimpose the actual images, the third lens allows the light beam incident thereon to transmit to the projection lens effectively, and an optical axis of each of the first lenses and an optical axis of each of the second lenses are parallel to the optical axis of the corresponding light condensing device.

26. A projection display apparatus according to claim 25, further comprising:

a plurality of lens units each including each of the first lenses and the corresponding second lens which are held integrally; and a frame including a reference plane which is at one of a parallel position and a perpendicular position with respect to the normal direction to the light valve, wherein the lens units are each arranged so as to be tilted in a prescribed direction at a prescribed angle with respect to the frame.

27. A projection display apparatus according to claim 25, further comprising:

a plurality of lamp units respectively including the luminous elements and the corresponding light condensing devices which are held integrally, each luminous element being a lamp;

a plurality of lens units provided in the same number as the lamp units to respectively correspond to the lamp units and respectively including the first lenses and the corresponding second lenses which are held integrally; and a frame including a reference plane which is at one of a parallel position and a perpendicular position with respect to the normal direction to the light valve, wherein each of the lamp units and each of the lens units are arranged so as to be tilted in a prescribed direction at a prescribed angle with respect to the frame.

28. A projection display apparatus for displaying an image on a screen by projection, comprising:

a light valve for forming an optical image by spatially modulating light;

a light source for forming light for illuminating the optical image; and a projection lens for projecting the optical image on the screen, wherein:

the light source includes:

at least two luminous elements each for emitting light, at least one lighting circuit for forming the luminous elements by power externally supplied; and a lighting control device for controlling the lighting circuit to light up at least one of the luminous elements selectively, wherein in the event the light source transmits light emitted by a plurality of the luminous elements to the optical image, the emitted light is transmitted in a superimposed state so as to illuminate the optical image; and the light control device changes the number of luminous elements to be lit up to change the brightness of an image displayed on the screen by projection.

29. A projection display apparatus according to claim 28, wherein:

the plurality of lamps are each a metal halide lamp, a plurality of lighting circuits are provided for respectively lighting up the metal halide lamps, and the lighting control device supplies power to a prescribed number of lighting circuits selectively to form the luminous elements.

30. A projection display apparatus according to claim 28, further comprising a lighting time accumulation device for accumulating lighting time of each of the plurality of luminous elements, wherein the lighting control device controls the lighting circuits to light up at least one of the luminous elements having shorter lighting time with priority based on data supplied by the light time accumulation device.

* * * * *